US011474597B2

United States Patent
Pulli et al.

(10) Patent No.: US 11,474,597 B2
(45) Date of Patent: Oct. 18, 2022

(54) LIGHT FIELD DISPLAYS INCORPORATING EYE TRACKERS AND METHODS FOR GENERATING VIEWS FOR A LIGHT FIELD DISPLAY USING EYE TRACKING INFORMATION

(71) Applicant: GOOGLE LLC, Mountain View, CA (US)

(72) Inventors: Kari Pulli, Fremont, CA (US); Gordon Wetzstein, Fremont, CA (US); Ryan Spicer, Fremont, CA (US); Andrew Jones, Fremont, CA (US); Tomi Maila, Fremont, CA (US); Zisimos Economou, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/087,053

(22) Filed: Nov. 2, 2020

(65) Prior Publication Data
US 2021/0132693 A1    May 6, 2021

Related U.S. Application Data

(60) Provisional application No. 62/929,666, filed on Nov. 1, 2019.

(51) Int. Cl.
*G06F 3/01* (2006.01)
*G02B 30/30* (2020.01)
*H04N 13/398* (2018.01)

(52) U.S. Cl.
CPC ............ *G06F 3/013* (2013.01); *G02B 30/30* (2020.01); *H04N 13/398* (2018.05)

(58) Field of Classification Search
None
See application file for complete search history.

(56) References Cited

U.S. PATENT DOCUMENTS 5,349,379 A    9/1994  Eichenlaub
5,625,372 A    4/1997  Hildebrand et al.
(Continued)

FOREIGN PATENT DOCUMENTS

WO    2014180554 A1    11/2014
WO    2018014040 A1     1/2018
(Continued)

OTHER PUBLICATIONS

International Search Report and Written Opinion for International Application No. PCT/US2020/058527, Search completed Jan. 5, 2021, dated Feb. 2, 2021, 16 pgs.
(Continued)

*Primary Examiner* — Talha M Nawaz
(74) *Attorney, Agent, or Firm* — Brake Hughes Bellermann LLP

(57) ABSTRACT

A multiview autostereoscopic display includes a display area including an array of angular pixels, an eye tracker, and a processing system. Each angular pixel emits color that varies across a field of view of that angular pixel. The array of angular pixels displays different views in different viewing zones across the field of view of the display. The eye tracker detects the presence of the eyes of at least one viewer within specific viewing zones and produces eye tracking information including locations of the detected eyes within the specific viewing zones. The processing system renders a specific view for each detected eye based upon the location of the detected eye within the viewing zone with detected eyes, and generates control information for the array of angular pixels to cause the specific view for each detected eye to be displayed in the viewing zone in which that eye was detected.

16 Claims, 21 Drawing Sheets

(56) References Cited

U.S. PATENT DOCUMENTS

| | | | |
|---|---|---|---|
| 5,777,720 | A | 7/1998 | Shapiro et al. |
| 5,991,084 | A | 11/1999 | Hildebrand et al. |
| 6,339,417 | B1 | 1/2002 | Quanrud |
| 11,100,844 | B2 * | 8/2021 | He ........................ G09G 3/3208 |
| 11,145,123 | B1 * | 10/2021 | Chor ...................... G06V 20/20 |
| 2008/0007559 | A1 * | 1/2008 | Kalaiah ................ H04N 13/275 |
| | | | 345/419 |
| 2008/0231805 | A1 | 9/2008 | Schwerdtner |
| 2010/0149313 | A1 | 6/2010 | Kroll et al. |
| 2010/0303294 | A1 | 12/2010 | Zschau |
| 2012/0194508 | A1 | 8/2012 | Panas et al. |
| 2013/0127861 | A1 * | 5/2013 | Gollier ................... H04N 17/04 |
| | | | 345/426 |
| 2013/0154498 | A1 | 6/2013 | Missbach |
| 2014/0361990 | A1 | 12/2014 | Leister |
| 2016/0234487 | A1 | 8/2016 | Kroon et al. |
| 2017/0237970 | A1 | 8/2017 | Karafin et al. |
| 2018/0063519 | A1 | 3/2018 | Smithwick et al. |
| 2018/0356591 | A1 | 12/2018 | Karafin et al. |
| 2018/0372926 | A1 | 12/2018 | Karafin et al. |
| 2018/0372958 | A1 | 12/2018 | Karafin et al. |
| 2019/0004228 | A1 | 1/2019 | Bevensee et al. |
| 2019/0004319 | A1 | 1/2019 | Karafin et al. |
| 2019/0004326 | A1 | 1/2019 | Karafin et al. |
| 2019/0011621 | A1 | 1/2019 | Karafin et al. |
| 2019/0064435 | A1 | 2/2019 | Karafin et al. |
| 2019/0247182 | A1 | 8/2019 | Bogaert |
| 2019/0333443 | A1 | 10/2019 | He et al. |
| 2019/0333444 | A1 | 10/2019 | He et al. |
| 2019/0335165 | A1 | 10/2019 | He et al. |
| 2020/0195895 | A1 | 6/2020 | Wiersma et al. |
| 2020/0261157 | A1 * | 8/2020 | Chen ...................... G06T 7/0012 |
| 2020/0265594 | A1 * | 8/2020 | Aguirre-Valencia ... G06F 3/011 |
| 2020/0265618 | A1 * | 8/2020 | Chen ........................ A61B 6/50 |

FOREIGN PATENT DOCUMENTS

| | | | |
|---|---|---|---|
| WO | 2018014044 | A1 | 1/2018 |
| WO | 2018014045 | A2 | 1/2018 |
| WO | 2018014048 | A2 | 1/2018 |
| WO | 2019140269 | A1 | 7/2019 |
| WO | 2019140343 | A1 | 7/2019 |
| WO | 2019140346 | A2 | 7/2019 |
| WO | 2019140347 | A1 | 7/2019 |
| WO | 2019140348 | A2 | 7/2019 |
| WO | 2019140398 | A1 | 7/2019 |
| WO | 2019140405 | A1 | 7/2019 |
| WO | 2019140413 | A1 | 7/2019 |
| WO | 2019140414 | A1 | 7/2019 |
| WO | 2019140416 | A2 | 7/2019 |
| WO | 2021087450 | A1 | 5/2021 |

OTHER PUBLICATIONS

"The Parallel Reality Technology", MisappliedSciences, Retrieved from: misappliedsciences.com/Home/Technology, Retrieved on May 10, 2019, 7 pgs.

Aksit et al., "Light Engine and Optics for Helium3D Auto-Stereoscopic Laser Scanning Display", 2011 3DTV Conference: The True Vision—Capture, Transmission and Display of 3 D Video, May 16-18, 2011, Antalya, Turkey, 4 pgs.

Algorri et al., "Liquid Crystal Microlenses for Autostereoscopic Displays", Materials, vol. 9, No. 36, 2016, 17 pgs., DOI: 10.3390/ma9010036.

Bates et al., "Building an Autostereoscopic Multiple-Viewer Television Display", 8th Asian Symposium on Information Display, Nanjing, Jiangsu, China, Feb. 14-17, 2004, 4 pgs.

Buckley et al., "Multi-Viewer Autostereoscopic Display with Dynamically-Addressable Holographic Backlight", Apr. 2009, DOI: 10.1889/JSID17.4.345, 6 pgs.

De La Barre, Rene, "Adapting of Electronic Image Content for Autostereoscopic Presentation", Fraunhofer Heinrich Hertz Institute, White paper, Jan. 2010, 16 pgs.

Dodgson, "Analysis of the viewing zone of multi-view autostereoscopic displays", Stereoscopic Displays and Applications XIII, Jan. 21-23, 2002, San Jose, CA, 12 pgs.

Dodgson, "On the No. of viewing zones required for head-tracking autostereoscopic display", Proceedings of SPIE, The International Society for Optical Engineering, Feb. 2006, 12 pgs.

Dodgson, Neil, "Autostereoscopic 3D Displays", IEEE Computer Society, Aug. 2005, pp. 31-36.

Jones et al., "Interpolating Vertical Parallax for an Autostereoscopic 3D Projector Array", Journal of Electronic Imaging, vol. 23, No. 1, Mar. 5, 2014, 20 pgs.

Jurik et al., "Prototyping a Light Field Display Involving Direct Obervation of a Video Projector Array", CVPR 2011 Workshops, Jun. 20-25, 2011, Colorado Springs, CO, 6 pgs.

Kang et al., "Feasibility of Eye-tracking based Glasses for 3D Autostereoscopic Display Systems for Medical 3D Images", In the Proceedings of the 9th International Joint Conference on Biomedical Engineering Systems and Technologies, vol. 2, 2016, pp. 134-138.

Kellnhofer et al., "GazeStereoSD: Seamless Disparity Manipulations", SIGGRAPH 2016 Technical Paper, Jul. 24-28, 2016, Anaheim, CA, 13 pgs., DOI:http://dx.doi.org/10.1145/2897824.2925866.

Kooima et al., "A Multi-view Tiled Autostereoscopic Virtual Reality Display", VRST 2010: Proceedings of the 17th ACM Symposium on Virtual Reality Software and Technology, Nov. 2010, 4 pgs.

Lee et al., "Autostereoscopic 3D display using directional subpixel rendering", Optics Express, vol. 26, No. 16, Aug. 6, 2018, 15 pgs.

Levoy et al., "Light Field Rendering", In Proceedings of SIGGRAPH 1996, pp. 31-42.

Li et al., "Enhancing 3D Applications Using Stereoscopic 3D and Motion Parallax", Proceedings of the Thirteenth Australasian User Interface Conference, Melbourne, Australia, Jan. 2012, pp. 59-68.

Perlin et al., "An Autostereoscopic Display", SIGGRAPH, New Orleans, LA, Jul. 23-28, 2000, 8 pgs.

Surman et al., "A Road Map for Autostereoscopic Multi-Viewer Domestic TV Displays", 2006 IEEE International Conference on Multimedia and Expo, Jul. 9-12, 2006, Toronto, Canada, 4 pgs.

Surman et al., "Head tracked retroreflecting 3D display", Journal of the Society for Information Display, 2015, DOI: 10.1002/jsid.295, 13 pgs.

Surman et al., "Head Tracked Single and Multi-user Autostereoscopic Displays", The 3rd European Conference on Visual Media Production, Part of the 2nd Multimedia Conference 2006, Nov. 29-30, 2006, London, UK, 9 pgs.

Surman et al., "Muted and HELIUM3D autostereoscopic displays", 2010 IEEE International Conference on Multimedia and Expo, Jul. 19-23, 2010, Suntec City, SG, 6 pgs.

Urey et al., "State of the Art in Stereoscopic and Autostereoscopic Displays", Proceedings of the IEEE, vol. 99, No. 9, Apr. 2011, pp. 540-555.

Visionsystems Design, "Autostereoscopic system delivers 3-D images using cylindrical lenses", May 1, 2000, Retrieved from: https://www.vision-systems.com/articles/print/volume-5/issue-5/applications/spotlight/autostereoscopic-system-delivers-3-d-images-using-cylindrical-lenses.html, 14 pgs.

Willman et al., "16.4: The Optics of an Autostereoscopic Multiview Display", DOI: 10.1889/1.3500412, 2010, 4 pgs.

Woodgate et al., "Observer Tracking Autostereoscopic 3D Display Systems", Signal Process: Image Communication, vol. 14, Issue No. 1-2, Nov. 6, 1998, 10 pgs.

Woods, Andrew, "How are Crosstalk and Ghosting defined in the Stereoscopic Literature", Proceedings of SPIE Stereoscopic Displays and Applications XXII, vol. 7863, 2011, 12 pgs.

* cited by examiner

LIGHT FIELD DISPLAYS INCORPORATING EYE TRACKERS AND METHODS FOR GENERATING VIEWS FOR A LIGHT FIELD DISPLAY USING EYE TRACKING INFORMATION

PRIORITY CLAIM

The present application claims the benefit of U.S. Patent Application Ser. No. 62/929,666, filed Nov. 1, 2019 and entitled "Light Field Displays Incorporating Eye Trackers and Methods for Generating Views for Multiview Autostereoscopic Display Using Eye Tracking Information," which is incorporated herein by reference in its entirety.

FIELD OF THE INVENTION

The present invention relates generally to three-dimensional (3D) displays and more specifically to multiview autostereoscopic 3D displays that incorporate eye trackers.

BACKGROUND

The human vision system is able to interpret 3D structure from 2D projections using cues such as occlusion, perspective, familiar size, and atmospheric haze. However, 2D images are unable to represent a number of significant depth cues including stereo parallax, motion parallax, accommodation, and convergence. 3D displays that provide a different image to each eye of a viewer are referred to as stereoscopic displays. Most commercially available 3D display technologies require the viewer to wear special glasses that allow the display to present different images to each eye of the wearer. A limitation of 3D displays that utilize special glasses to provide different images to each eye of the wearer is that the images are typically not dependent upon the head position of the wearer. As conceptually illustrated in FIG. 1, a display 100 presents a Left (L) and a Right (R) image to the left and right eyes of the viewer, respectively, ideally located at the ideal viewing location 102. These images will be the same irrespective of the location of the viewer and the depth cues may become inconsistent with the content of the scene the further the viewer is located from the ideal viewing location, such as at locations 104 and 106.

An alternative to using special glasses is to mount two small displays in front of a viewer's eyes, such as within a pair of goggles or a headset. As the viewer's head moves and the head motion is tracked by the headset (e.g., using an accelerometer, a gyroscope, position sensors, infrared emission, a camera, and/or a magnetometer), the display can present viewpoint-dependent images on the two displays to provide stereo parallax, and motion parallax. The need to wear a headset and the resulting isolation from the real world can significantly limit the usefulness of head-worn 3D displays such as virtual reality, mixed reality, and/or augmented reality glasses.

Autostereoscopic displays create a binocular perception of 3D depth without the requirement that the user wear special headgear, such as glasses or a headset. Autostereoscopic displays typically utilize spatial multiplexing of images, which can be implemented in a variety of ways including placement of parallax barriers in front of a display, placement of a lenticular lens array or microlens array in front of a display, and using an array of projectors.

Multiview autostereoscopic light field displays are a class of autostereoscopic display that forms different images in different viewing zones across the field of view of the display. As a result, multiview autostereoscopic light field displays are not limited to simply providing different images to each of the viewer's eyes at a given time, but as the user moves, the images displayed to each eye vary in a manner that is dependent upon the location of the viewer. In this way, multiview autostereoscopic light field displays can provide both stereo and motion parallax. However, commercialization of multiview autostereoscopic light field displays has proven challenging due to the difficulty of building a display that can display many views and the computational complexity of generating all the views simultaneously.

SUMMARY OF THE DISCLOSURE

The following presents a simplified summary of one or more aspects in order to provide a basic understanding of such aspects. The summary is not an extensive overview of all contemplated aspects, and is intended to neither identify key or critical elements of all aspects nor delineate the scope of any or all aspects. The purpose is to present some concepts of one or more aspects in a simplified form as a prelude to the more detailed description presented later.

In an aspect, a multiview autostereoscopic display for providing a plurality of views to a viewer is presented. The display includes a display area, including an array of angular pixels. Each angular pixel is configured for emitting light that varies across a field of view of that angular pixel. The array of angular pixels is configured for displaying different views in different viewing zones across a field of view of the display. The display further includes at least one eye tracker configured for detecting the presence of eyes of the viewer within specific viewing zones and producing eye tracking information related to locations of the eyes so detected within the specific viewing zones. The display additionally includes a processing system configured for rendering a specific view for each one of the eyes so detected, based upon the location of that eye within the viewing zone in which that eye was detected, and generating control information for the array of angular pixels to cause the specific view for that eye to be displayed in the viewing zone in which that eye was detected.

In another aspect, processing system of the multiview autostereoscopic display is further configured for rendering at least one of reduced resolution views, reduced density views, and two-dimensional views for display in specific viewing zones based upon eye tracking information.

In still another aspect, the eye tracking information includes confidence information indicating a level of uncertainty associated with a tracked eye location, and the processing system is further configured for adjusting the rendering according to the confidence information.

In yet another aspect, the processing system is configured for generating control information for a plurality of logical emitters. The display area further includes backplane circuitry configured for receiving the control information for the plurality of logical emitters, and interpolating the control information for the plurality of logical emitters to control information for the array of angular pixels in the display area.

In another aspect, the display is configured for providing views viewable by a first viewer and a second viewer. The at least one eye tracker is further configured for simultaneously tracking eyes of the first and second viewers. The processing system is further configured for rendering specific views based upon a first scene for each detected eye of the first viewer, and rendering additional views based upon a second scene for each detected eye of the second viewer, the second scene being at least partially different from the first scene. The processing system is also configured for generating control information for the array of angular pixels such that, simultaneously, the specific views for each detected eye of the first viewer are displayed in viewing zones in which the eyes of the first viewer were detected, and the additional views for each detected eye of the second viewer are displayed in viewing zones in which the second viewer's eyes were detected. In a further aspect, the control information so generated by the processing system causes no view to be displayed outside the viewing zones in which at least one of the first and second viewer's eyes were detected. In still a further aspect, the display includes a first eye tracker for tracking the eyes of the first viewer, and a second eye tracker for tracking eyes of the second viewer.

In another aspect, the processing system further includes memory configured for storing calibration information for the array of angular pixels. The processing system generates the control information for the plurality of emitters in the angular pixels in the display area based upon the calibration information and target intensities for a set of ray directions from the display area.

In yet another aspect, the processing system is further configured for optimizing the control information for mitigating at least one of ghosting, optical crosstalk between viewing zones, and pixel-level optical crosstalk.

BRIEF DESCRIPTION OF THE DRAWINGS

The appended drawings illustrate only some of the considered implementations and are therefore not to be considered limiting of scope.

DETAILED DESCRIPTION

Figure 1:
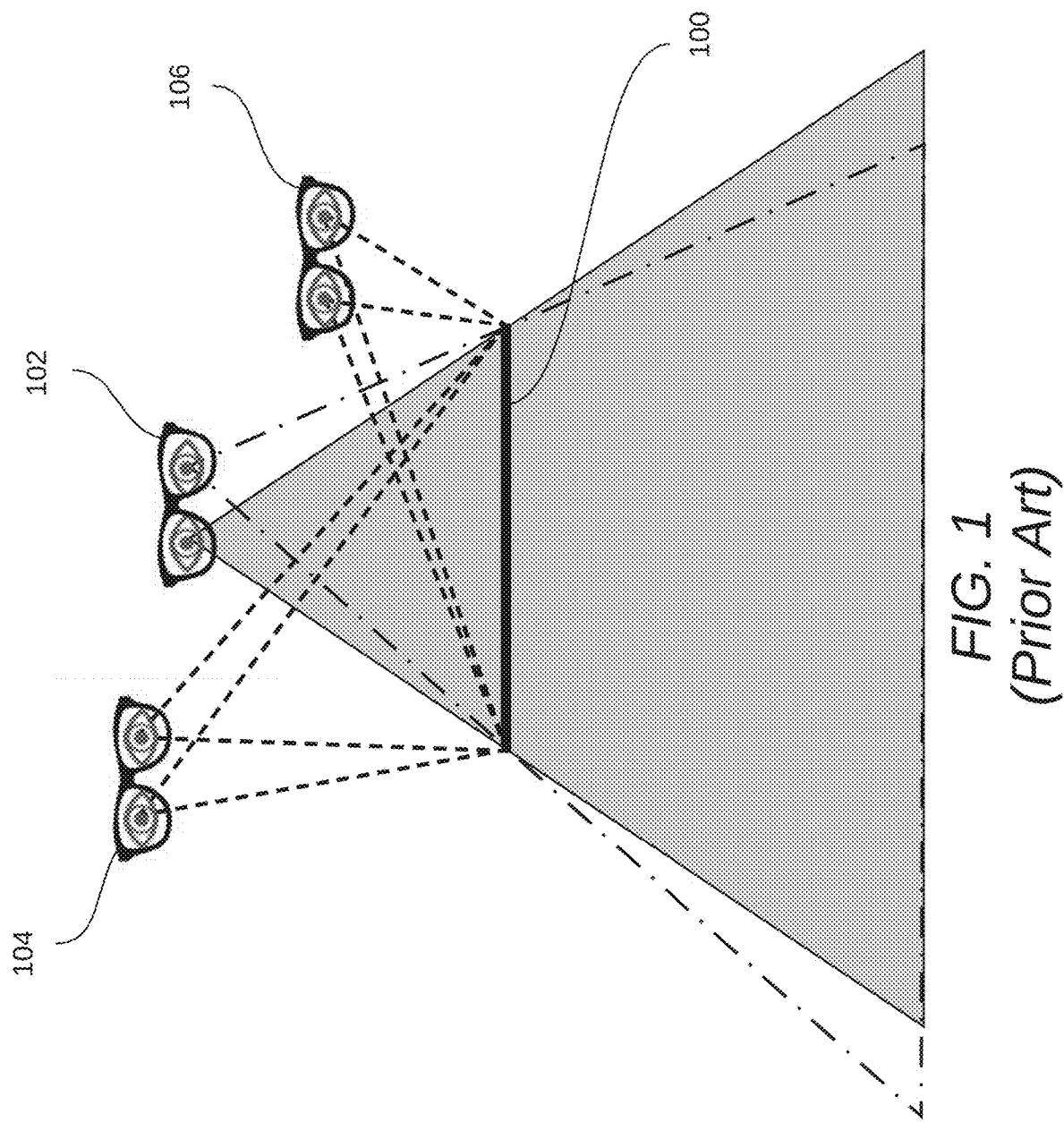
FIG. 1 conceptually illustrates a 3D display that utilize glasses to provide different images to each eye of the wearer.

Turning now to the drawings, light field displays that incorporate eye trackers and processes that utilize eye tracking data in the generation of views for multiview autostereoscopic display in accordance with various embodiments of the invention are illustrated. The term light field display is used herein to refer to a class of multiview autostereoscopic display that includes several orders of magnitude more emitters than conventional autostereoscopic displays. Accordingly, light field displays achieve a significantly higher density of different views compared to conventional autostereoscopic displays. The increased number of views comes with a potential proportionate increase in the processing required to generate the number of views utilized for multiview autostereoscopic display.

Systems and methods in accordance with a number of embodiments of the invention utilize eye trackers to reduce the number of views that are generated for autostereoscopic display. In many embodiments, views are generated corresponding to the specific locations of tracked eyes. These views can be displayed within viewing zones occupied by the tracked eyes and, in many instances, adjacent viewing zones to accommodate eye tracking uncertainty. In many embodiments, the views are rendered for display in overlapping viewing zones so that the superposition of the views on a viewer's retina create a desired image. The integration of eye tracker information with the data related to the generation of views for a light field display provides a variety of advantages for reducing the computational and energy loads required in providing light field views by such a multiview autostereoscopic display.

An eye tracker is a system that can track the location of the eyes of one or more people. An eye tracker typically determines the location of each viewer's eyes in three-dimensional space and, in many instances, determines the rotation of each eye with respect to a frame of reference, yielding the gaze direction. In a number of embodiments, the eye tracker tracks the center of the pupil of each eye. In many embodiments of the invention, the eye tracker determines the locations of the centers of the focal plane of each eye. For instance, since the focal plane of the eye is approximately opposite the pupil on the retina and so the location of the focal plane can be inferred from a known pupil location. In a number of embodiments, a hierarchical eye tracking process is utilized. An eye tracker can be differentiated from a head tracker, which simply determines the location of a viewer's head. An eye tracker can also be differentiated from a gaze tracker, which determines the location of the viewer's eyes and the direction in which the viewer is looking. While much of the discussion that follows relates to light field displays that incorporate at least one eye tracker and utilize eye tracking information to generate views for multiview autostereoscopic display, systems and methods in accordance with several embodiments of the invention can utilize gaze trackers and/or head trackers as an alternative to or in addition to eye trackers, as appropriate due to the requirements of specific applications. Furthermore, light field displays in accordance with many embodiments of the invention can be utilized in head mounted displays in which eye and/or gaze tracking is performed by the head mounted display in conjunction with head pose tracking using sensors such as (but not limited to) accelerometers within the head mounted display.

As mentioned above and is discussed further below, the ability to identify viewing zones in which eyes are located enables light field displays in accordance with many embodiments of the invention to achieve energy, processing and/or design efficiencies. In several embodiments, a light field display can turn off emitters based upon eye tracking information to limit the views displayed to the viewing zones where viewers are likely to be located. In this way, light field displays can achieve significant energy savings. Furthermore, bandwidth requirements between the display's processing system and backplane control circuitry can be reduced by only providing emitter control data for active emitters and/or with respect to a set of logical emitters that is significantly smaller than the actual number of physical emitters. In a number of embodiments, the light field display can achieve additional processing efficiencies by varying the resolution and/or extent to which disparity is rendered in views displayed within viewing locations in which no tracked eyes are detected (e.g., viewing zones adjacent a viewing zone in which a tracked eye is detected). Where gaze tracking information is available to a light field display, additional processing efficiencies can be achieved by rendering foveated views in which resolution and/or disparity information within the rendered views varies based upon gaze direction. Light field displays that incorporate parallel processing systems in accordance with many embodiments of the invention can also employ advanced rendering pipelines that apply 3D and/or 2D warps and translations post-render to continuously update the viewpoint from which a view is rendered based upon eye tracking information updates received during the view processing. In this way, the viewpoints from which displayed views are rendered can correspond as closely as possible to the locations of each viewer's eyes at the point in time that the light field display is refreshed and the views are displayed.

The ability to render different views within different viewing zones based upon eye tracking information also enables light field displays in accordance with several embodiments of the invention to support a variety of useful modes. In many embodiments, the light field display can render views of scenes that are at least partially different to different viewers. In this context, a scene refers to a 3D model or a piece of content presented for viewing a user. In this way, two or more viewers can simultaneously view two or more different pieces of content via a light field display in accordance with various embodiments of the invention. In a number of embodiments, the light field display can support a privacy mode in which the viewing zones in which views are displayed are determined based upon the viewing zones occupied by the eyes of authorized viewers. The light field display can either deactivate emitters that display views in viewing zones in which the eyes of unauthorized viewers are detected or present a view containing a privacy warning or innocuous content.

In a number of embodiments, the use of an eye tracker enables the light field display to employ a hybrid approach for displaying horizontal parallax and vertical parallax. Instead of providing emitters to handle vertical parallax, eye tracking can be utilized to determine the vertical position and the distance of a viewer's eyes relative to the display area. Once the vertical position and the distance of the viewer's eyes with respect to the display is known, the viewer's perspective can be utilized to generate the view displayed in the viewing zones in which the viewer's eyes are located. In this way the eye tracker can reduce the total number of emitters within a light field display, because each angular pixel can be implemented with a single row of emitters to handle horizontal parallax and vertical parallax is handled computationally. In the absence of eye tracking, multiple rows of emitters can be used to handle vertical parallax.

In several embodiments, the angular pixels utilized within the light field displays incorporate microlenses effecting optical aberrations that can result in light from emitters within the angular pixels leaking into ray directions other than a primary intended direction. For example, the leakage of light from one emitter in an angular pixel into multiple undesired ray directions is a form of optical cross-talk. In a number of embodiments, groups of emitters within an angular pixel can be jointly controlled to achieve a desired linear combination of emitted intensities of all emitters. In many embodiments, the intensities of the emitters within an angular pixel are determined so that rays from the angular pixel perceived within one or more specific viewing zones are as close as possible to the intended rays. In several embodiments, the light emission of emitters from multiple angular pixels are determined so that rays from the light field display perceived within one or more specific viewing zones are as close as possible to the intended rays. In certain embodiments, eye tracking information can be utilized to determine the specific emitters contributing to views displayed within viewing zones occupied by tracked eyes. For example, when a user is further from the light field display emitters a greater number of angular pixels covering a larger area of the light field display may contribute to a perceived ray. Similarly, when the perceived ray is in the fovea (i.e., the center of the field of vision) of a user's field of view, then the angular pixels that contribute to the perceived ray represent a smaller area of the light field display than when the perceived ray is in the periphery of the user's field of view. In many embodiments, the intensities of the jointly controlled emitters are determined to minimize the difference between the perceived light field and a target light field. In several embodiments, however, additional constraints are imposed upon the jointly controlled emitters including (but not limited to) constraints that increase the dynamic range and/or black level of the light field display. As can readily be appreciated, the specific constraints utilized to jointly control emitters in one or more angular pixels within light field displays in accordance with various embodiments of the invention are largely dependent upon the requirements of a given application.

While much of the discussion herein is in the context of light field displays, processes in accordance with various embodiments of the invention can be utilized in any multiview autostereoscopic display system including (but not limited to) parallax barrier, lenticular, microlens, holographic, head mounted, and/or projector-based multiview autostereoscopic display systems that incorporate one or more eye trackers as appropriate to the requirements of a given application. Light field displays that incorporate eye trackers and processes for utilizing eye tracking data to generate images for multiview autostereoscopic display in accordance with a number of embodiments of the invention are discussed further below.

Light Field Displays Incorporating Eye Trackers

Figure 2:
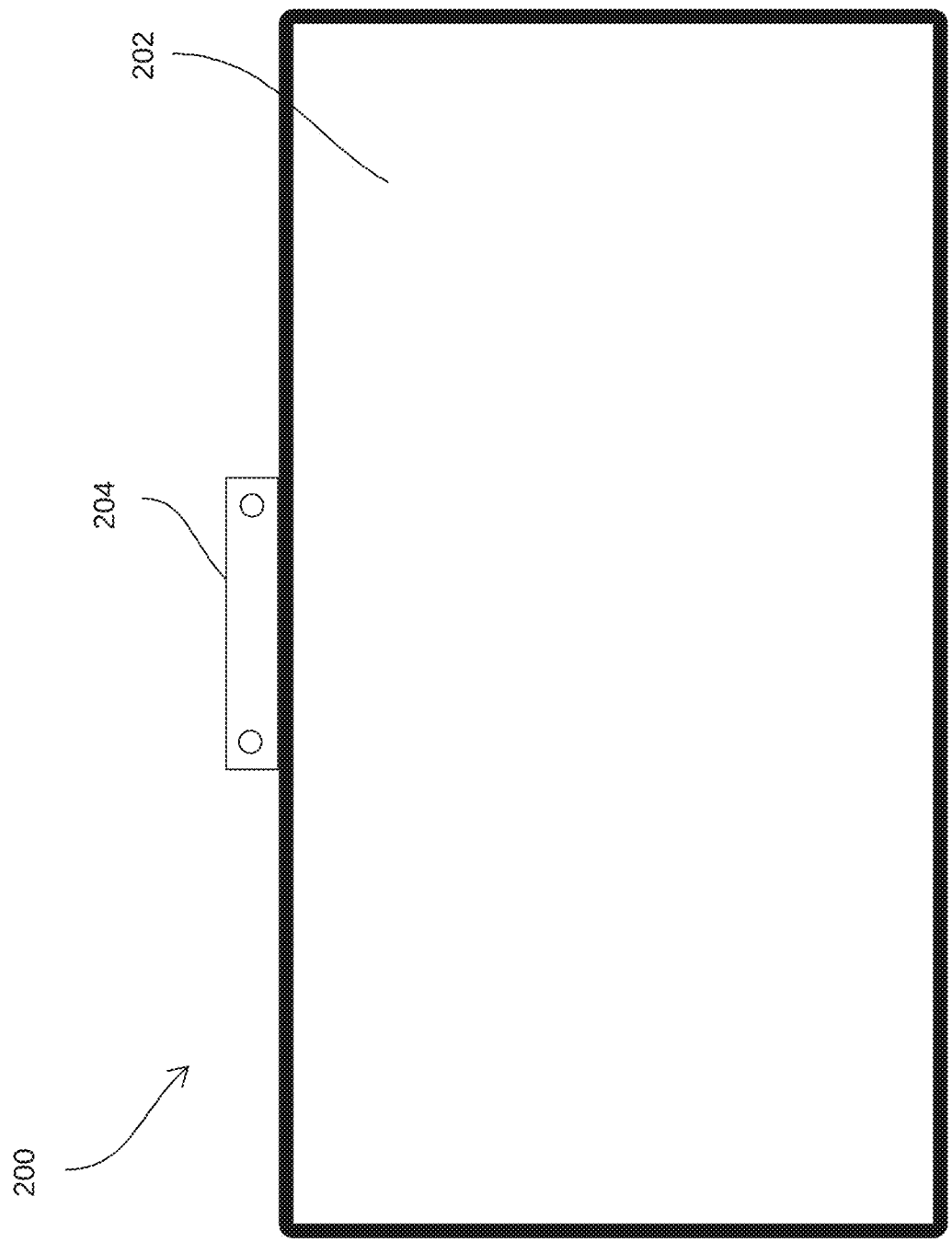
FIG. 2 illustrates a light field display that includes a display area formed by an array of angular pixels and one or more eye trackers, in accordance with an embodiment of the invention.

A light field display 200 that includes a display area 202 formed by an array of angular pixels and one or more eye trackers 204 in accordance with an embodiment of the invention is illustrated in FIG. 2. Each angular pixel can be thought of as similar to a conventional pixel in a 2D display with the difference that its appearance can vary across the field of view of the display. In this way, each viewing zone of the light field display can display an image with a resolution equal to the number of angular pixels in the light field display. Each angular pixel can include an array of light emitters, such as described for example in US Pat. Pub. No. US2019/0333443 A1, entitled "Architecture for Light Emitting Elements in a Light Field Display," US Pat. Pub. No. US2019/0335165 A1, entitled "Partial Light Field Display," and US Pat. Pub. No. US2019/0333444 A1, entitled "Architecture for Light Emitting Elements in a Light Field Display," all of which applications are incorporated herein by reference in their entirety. As is discussed further below, the number of emitters used to implement each angular pixel can be several orders of magnitude higher than the number of angular pixels.

Figure 3:
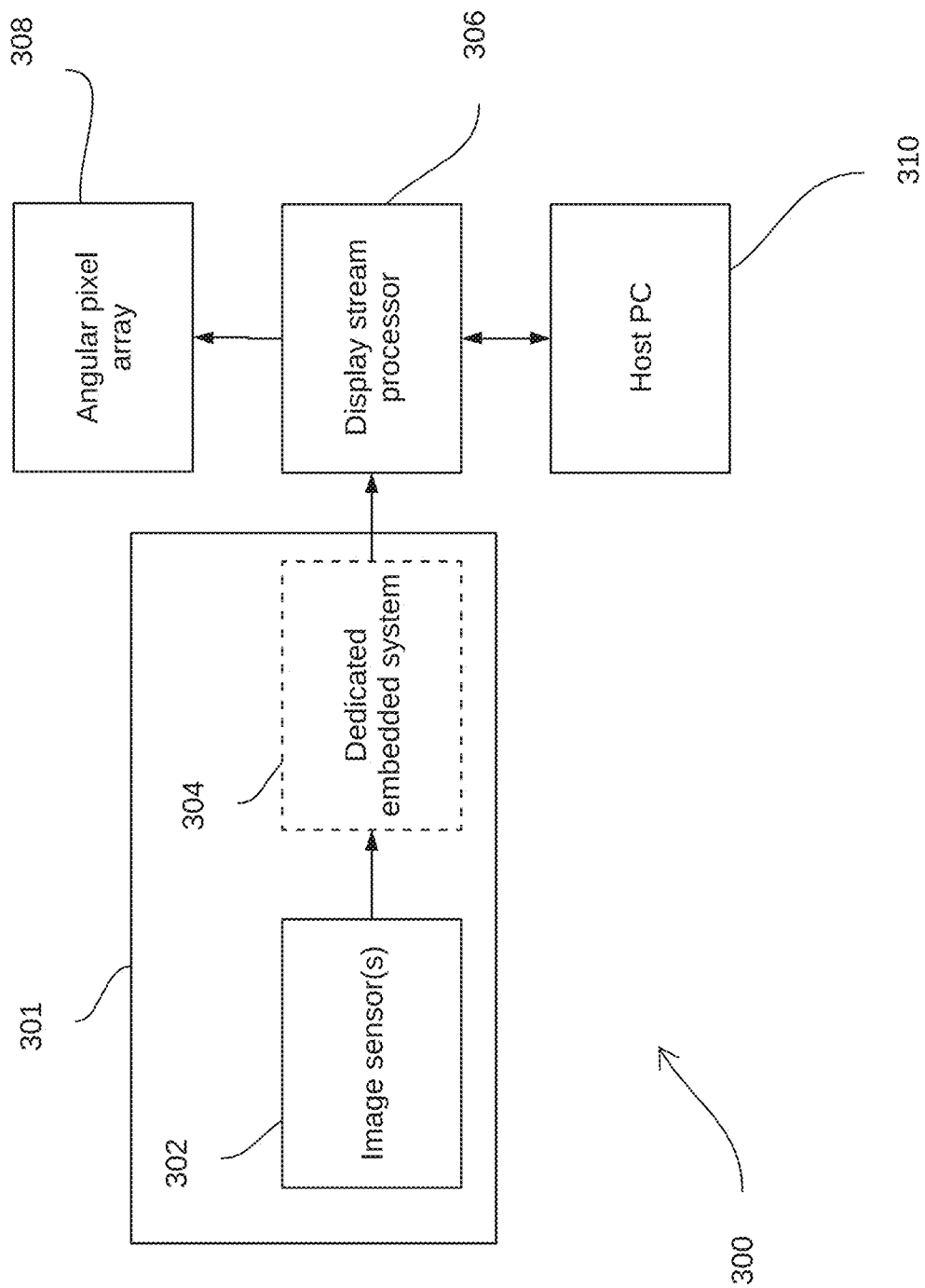
FIG. 3 conceptually illustrates a high-level overview of processing systems utilized within a personal computer incorporated with a light field display, in accordance with an embodiment of the invention.

The manner in which views are generated for autostereoscopic display by a light field display is largely dependent upon the particular application in which the light field display is being utilized. A high-level overview of a processing system utilized within a personal computer that incorporates a light field display in accordance with an embodiment of the invention is conceptually illustrated in FIG. 3. A processing system 300 includes an eye tracking system 301. In an embodiment, eye tracking system 301 includes one or more image sensors 302, such as a digital sensor array, infrared sensor, and/or a depth sensor. For instance, image sensors 302 may capture information regarding a viewer of the display for use in eye tracking processes. Additionally, image sensors 302 may capture live images and/or video to be displayed by a light field display. Eye tracking system 301 optionally includes a dedicated embedded system 304, which may be integrated into eye tracking system 301 as a dedicated unit for processing image input from image sensors 302 and generating eye tracking information. The specific processes that may be used in generating the eye tracking information are described in more detail below. Alternatively, image sensors 302 provide image data directly to a display stream processor 306, which drives an angular pixel array 308. Display stream processor 306 may process the image input from image sensors 302 to generate the eye and/or gaze tracking information, or may pass on the information to a host personal computer (PC) 310 to generate the eye tracking information. Exchange of data between image sensors 302, optional, dedicated embedded system 304, display stream processor 306, angular pixel array 308, and host personal computer (PC) 310 may take place via any of a variety of connections including (but not limited to) MIPI, I2C, USB, display port, video, HDMI, PCIE, and/or other connections. In the illustrated embodiment, rendering of views for display by angular pixel array 308 is performed using a processing system with a host personal computer (PC) 310 such as (but not limited to) an application processor (e.g., central processing unit (CPU)) and a graphics processing unit (GPU). The host PC 310 can receive eye and/or gaze tracking information from dedicated embedded system 304 via the display stream processor 306 and can utilize the information to render specific views that can then be utilized by the display stream processor to provide control information to a backplane of angular pixel array 308, which is utilized to generate the light field views.

Although specific hardware configurations are described above with respect to FIG. 3, any of a variety of dedicated and/or software configured processing hardware can be utilized to obtain eye tracking information and to render views used to control a light field display based upon eye tracking information as appropriate to the requirements of specific applications in accordance with various embodiments of the invention. Furthermore, the specific hardware components and/or the locations of the hardware components will typically vary depending upon the use case for the light field display (e.g., personal computer, gaming computer, television display, advertising billboard, etc.) and the techniques utilized to render the light field display.

Figures 4, 5:
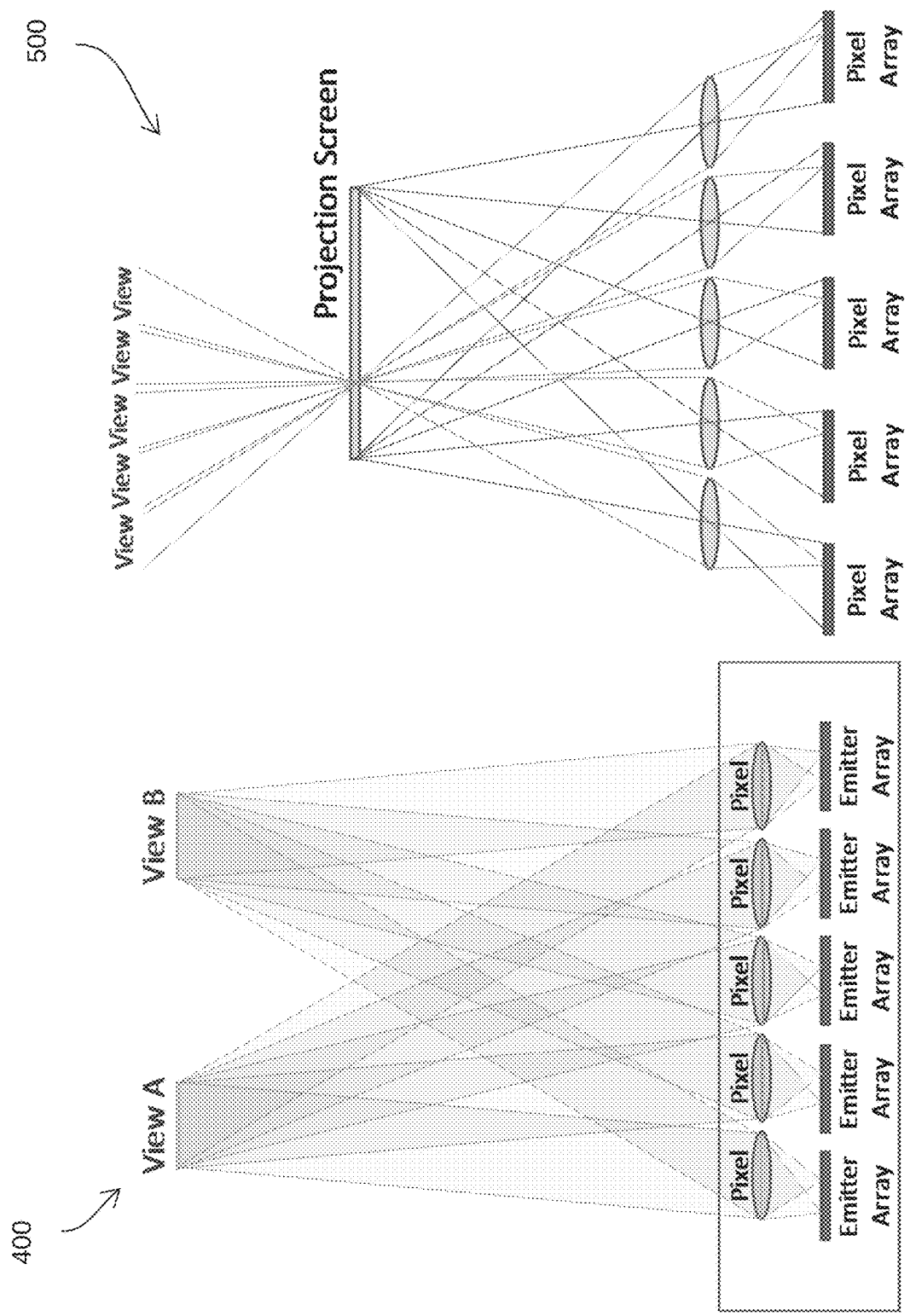
FIG. 4 illustrates a light field display including angular pixels formed by lens elements and arrays of emitters, in accordance with an embodiment of the invention.
FIG. 5 illustrates a light field display implemented using projectors, in accordance with an embodiment of the invention.

In a number of embodiments, each angular pixel is formed by an array of emitters positioned beneath each lens element in a lens array. A light field display 400 including angular pixels formed by lens elements and arrays of emitters is illustrated in FIG. 4. As noted above, a conventional multiview autostereoscopic display typically has a comparatively small number of emitters per lens element (i.e., 10s of emitters at most). Light field displays in accordance with a number of embodiments of the invention can include 100s or 1000s of emitters. For instance, each emitter array as shown in FIG. 4 may include a hundred or more emitters, each emitter contributing to at least one of multiple views, such as one of views A and B.

In another embodiment, a light field display 500 of FIG. 5 utilizes a rear projection architecture to provide a multitude of light field views. Light field display 500 includes multiple emitter arrays and a lens array, in a manner similar to light field display 400 of FIG. 4. However, rather than providing two distinct stereoscopic views A and B, as in FIG. 4, the emitter arrays and lens arrays are configured to cooperate to provide multiple views at each point on a projection screen, as represented by a fan of views viewable by viewers at different locations beyond the projection screen. Thus, viewers located at different locations see different views from light field display 500.

While much of the discussion that follows refers to light field displays implemented using lens elements and arrays of emitters as shown in FIG. 4, light field displays in accordance with various embodiments of the invention can also be implemented using projectors in a manner similar to the light field display 500 shown in FIG. 5. In addition, light field displays can be implemented via direct projection using an array of projectors. While the use of light field displays is desirable due to the density of views that can be produced by the light field display, systems and methods in accordance with various embodiments of the invention are in no way limited to the use of light field displays. Accordingly, systems and methods in accordance with a number of embodiments of the invention are implemented using a variety of conventional multiview autostereoscopic displays as appropriate to the requirements of specific applications.

Eye and Gaze Tracking Processes

As is discussed below, the manner in which a light field display presents different views in viewing zones across the field of view of the display is impacted by the confidence with which the eye tracking system is able to track the eyes of one or more viewer. In many embodiments, the light field display is designed to gracefully degrade the quality of the images displayed in particular viewing zones based upon the presence or absence of tracked eyes and/or the confidence with which a pair of eyes have been located. In several embodiments, multiple eye tracking systems and/or eye tracking modalities can be utilized to increase the likelihood that the light field display is able to reliably track the location of a viewer's eyes. For instance, multiple eye tracking systems positioned with a known baseline can be utilized to improve the reliability with which the 3D position of a viewer's eyes is estimated. Furthermore, providing eye trackers with different fields of view and/or multiple eye trackers oriented at different angles can enable eye tracking to continue when one or more of a viewer's eyes are occluded within the field of view of one of the eye trackers but not within the field of view of a second eye tracker.

Eye trackers utilized within light field displays in accordance with various embodiments of the invention can be implemented using any of a variety of commercially available eye tracking technologies to provide eye tracking information, which typically includes 3D location information for each tracked eye and, in many instances, one or more confidence metrics reflecting confidence in the detection of a tracked eye and/or the accuracy of the location information for the tracked eye. As can be appreciated from the discussion below, the greater the accuracy of the 3D eye tracking information provided by the eye tracker, the more useful the eye tracking information is to the light field display.

In a number of embodiments, an eye tracker is utilized that is implemented using a sensor system that projects infrared light and a camera system that captures images of the scene that include an infrared channel. The use of infrared light for eye tracking has the advantage that the eye tracker works well in indoor and/or low-light environments. Depth estimation based upon projected infrared light typically does not work well in the presence of natural sunlight. Therefore, eye trackers in accordance with several embodiments of the invention can also utilize multiple cameras to track eyes using, for example, multiview techniques. In several embodiments, eye locations can be determined in multiple images captured from different viewpoints and disparity between the eye locations can be utilized to determine the distance to the eye locations from one or more cameras. In this configuration, the cameras can be monochrome and/or capture image data in multiple color channels. In several embodiments, the camera system employed in the eye tracker is capable of capturing image data in the visible and infrared portions of the spectrum. The use of multiple cameras (particularly more than two cameras) can improve accuracy, handle occlusions more robustly, and/or support eye tracking across a wider field of view. In several embodiments, light-field camera based eye tracking is utilized. It is recognized herein that, the specific eye tracking sensors utilized to obtain eye tracking information for use in a light field display is largely dependent upon the requirements of a given application. The manner in which eye tracking information can be utilized to generate views for multiview autostereoscopic display in accordance with various embodiments of the invention is discussed further below.

Referring again to FIG. 2, light field displays can include an eye tracking system 204 positioned above the display area 202. Light field displays in accordance with various embodiments of the invention can include one or more eye tracking systems located above, below, to the side of, or integrated within the display area 202. In several embodiments, one or more eye tracking systems are provided that are distinct units housed separately from the display area 202 formed by the array of angular pixels and can be independently positioned. Alternatively, specific areas within the display area 202 may include sensors configured for providing eye tracking information.

In general, eye tracking can be a noisy process. For instance, eye tracking noise can introduce perspective noise and/or increase the complexity of determining the views to render using a light field display. A variety of filtering processes can be applied to eye tracking measurements to decrease errors in the instantaneous tracked location of a given eye. However, application of filtering processes can (in some instances) introduce a time delay between the instant at which sensor data is captured and the determination of a reliable tracked eye location from the sensor data. In addition, the filtering process can prevent the eye tracking process from reacting quickly to rapid eye movements. As is discussed in more detail below, the quality of a light field display can be impacted by differences between the eye location utilized to render a view and the actual location of the tracked eye at the time in which the view is displayed. Therefore, the benefits of using a filtering process to increase the accuracy with which an eye is tracked at a particular point in time diminish when the latency of the process means that the eye is no longer likely to be at the tracked location when the view is rendered for display. In addition, the smoothing applied by a filtering process can actually introduce a source of error when a rapid eye movement occurs. The difference between the tracked location of an eye generated by an eye tracking process at a particular point in time and the actual location of the eye at that time is often referred to as the lag between the tracked position and the actual position. Increasing the rate at which eye tracking is performed can be an effective method for reducing noise (i.e., errors) in tracked eye locations without introducing a significant time lag.

Figure 6A:
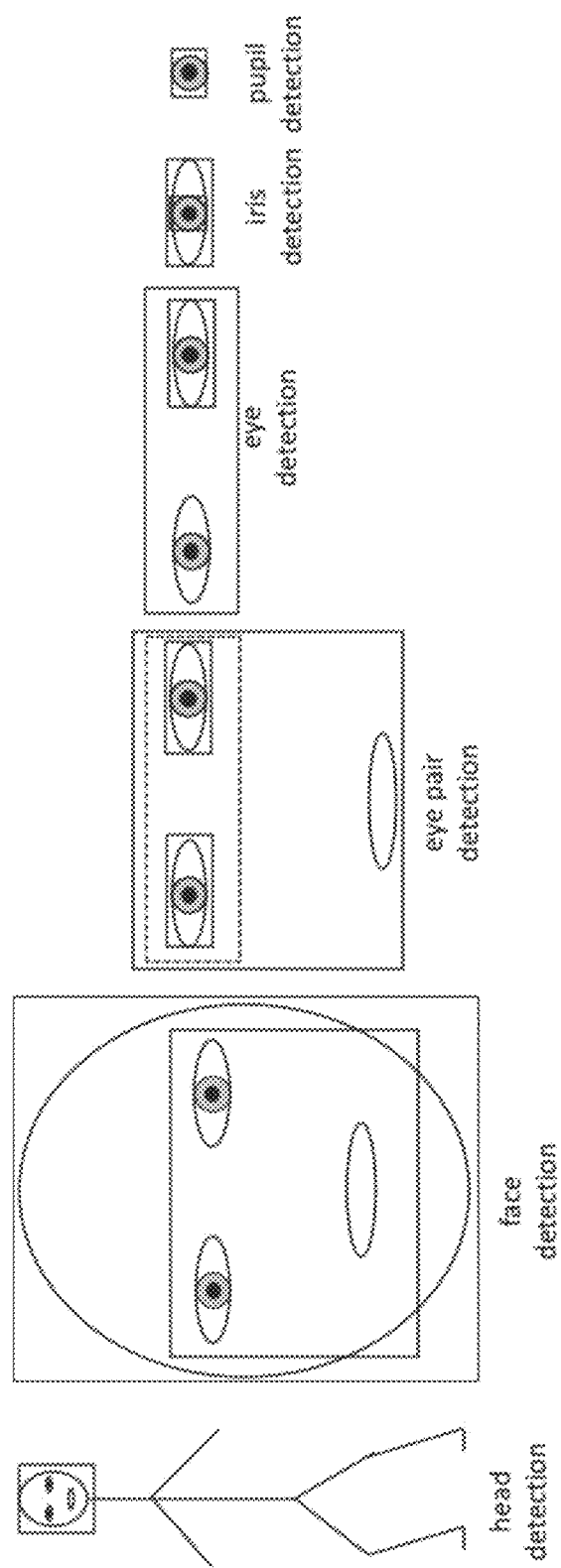
FIG. 6A illustrates a hierarchical eye tracking process.

In a number of embodiments, tracking the head, the face, the facial features, the eyes, the irises and the pupils all or part jointly or using hierarchical tracking can increase the computational efficiency of tracking eyes at high sampling rates without significantly increasing latency within the eye tracking system. In several embodiments, a hierarchical eye tracking process is utilized that involves detecting and tracking the presence of at least one viewer. In many instances, viewer tracking is performed in a manner that differentiates between different viewers. For each tracked viewer, the hierarchical eye tracking process can also detect and track the head and/or facial features of each viewer. In certain embodiments, such as shown in FIG. 6A, the head tracking process is able to determine the location and/or orientation of each viewer's head. Once a viewer's head is located, hierarchical eye tracking processes in accordance with many embodiments of the invention can determine the viewer's inter-pupil distance (IPD). This IPD may be refined over successive frames/observations. The hierarchical eye tracking process can also detect and track combinations of a face, facial features, an eye pair, an eye, an iris, and/or a pupil location and orientation. In several embodiments, the IPD can be utilized to constrain the search for viewer's eyes to increase the computational efficiency of the eye tracking process. In addition, filtering and/or prediction processes including (but not limited to) statistical filtering processes can also be utilized to predict the location of tracked pupil locations (potentially based upon the location of another tracked eye and/or IPD) in the event that tracking for a particular eye is lost for some period of time.

Figure 6B:
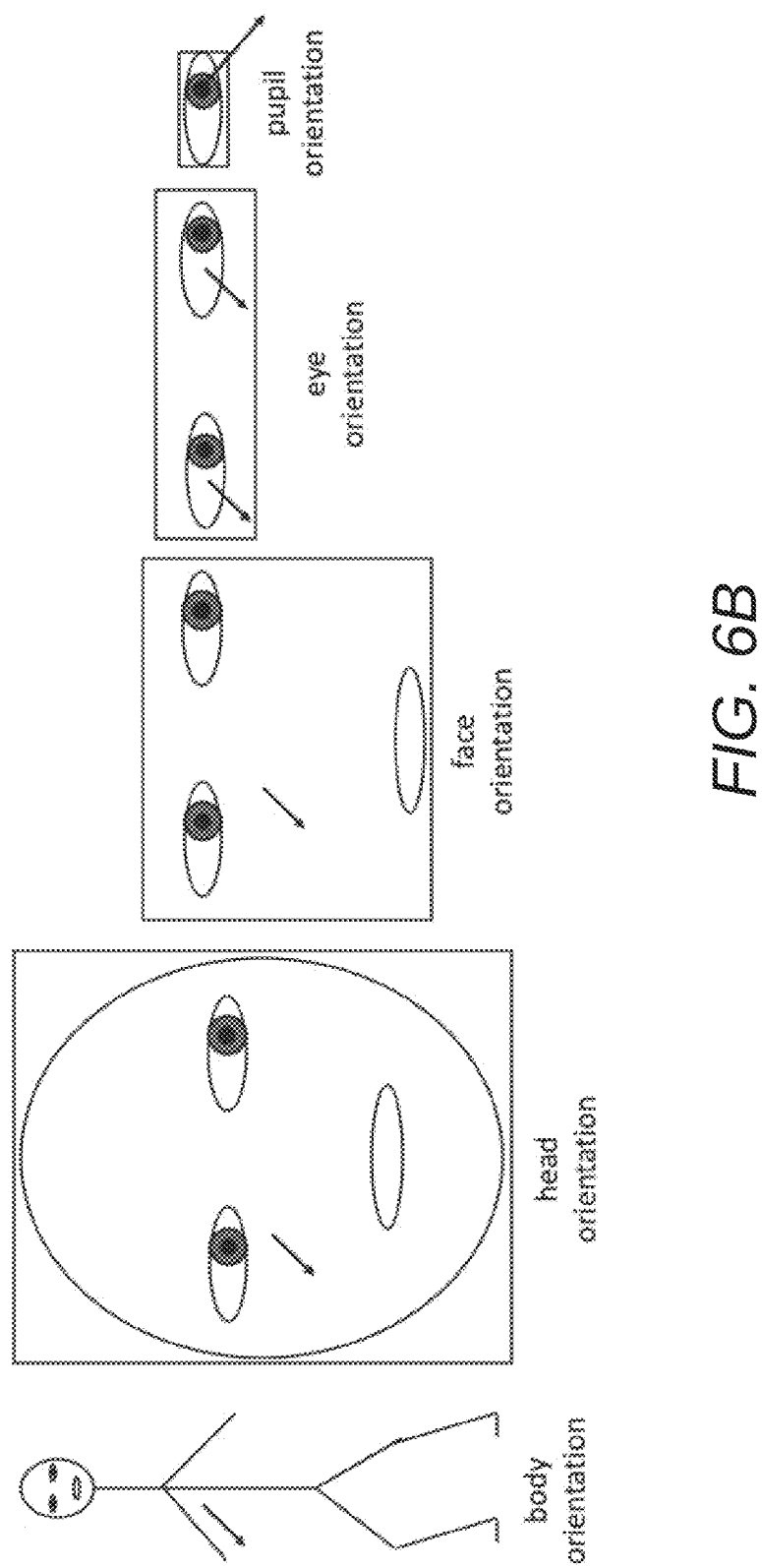
FIG. 6B illustrates a hierarchical gaze tracking process.

As can readily be appreciated, any of a variety of joint, partially joint, and/or hierarchical tracking processes can be utilized to track eyes as appropriate to the requirements of specific applications including (but not limited to) hierarchical gaze tracking processes similar to the process conceptually illustrated in FIG. 6B. For example, like the hierarchical eye tracking process illustrated in FIG. 6A, the hierarchical gaze tracking process of FIG. 6B begins with identification of the body location, then head location, face orientation, eye orientation, then pupil orientation in order to determine the gaze direction. Furthermore, the specific eye and/or gaze tracking process that is utilized is largely dependent upon the sensors available for performing eye tracking, the processing power, and/or the accuracy requirements of a specific application. The manner in which light field displays in accordance with various embodiments of the invention can utilize eye tracking and/or gaze tracking information to render views for display in different viewing zones is discussed further below.

Eye Position Dependent Rendering

Light field rendering was described in Levoy, M. and Hanrahan, P., 1996, August, "Light field rendering," In *Proceedings of the 23rd annual conference on Computer graphics and interactive techniques* (pp. 31-42), ACM. This publication is hereby incorporated by reference in its entirety. In light field rendering, a scene can be represented as a four-dimensional function over position and angle, assuming a non-participating medium. The light field can be parameterized as all possible rays between a camera plane (u,v) and a focal plane (s,t). For each such ray the light field stores a color. In practice, a subset of the light field is often represented as an array of two dimensional images. The (s,t) plane can be quantized by the resolution of the images making up the light field, and the (u,v) plane can be quantized by camera positions. Given an arbitrary eye position, a novel view of the light field may be synthesized by sampling a ray $L(u,v,s,t)$ for each pixel of the output image. If the ray $L(u,v,s,t)$ is not available, it may be interpolated from nearby ray $L(u',v',s',t')$ values that are stored in the light field. Since the number of rays required to represent a scene grows as a power of four rather than two, light field rendering has historically been considered to be computationally demanding.

Light field displays in accordance with many embodiments of the invention can utilize light field rendering to render views for display in particular viewing zones. This rendering may occur in software, and/or in hardware. In many embodiments, the rendering process has access to eye tracking information that specifies a number of viewer eye locations (x,y,z) relative to the display. In several embodiments, the eye tracking information also includes confidence information that indicates the level of uncertainty associated with a particular tracked eye location. In a number of embodiments, a rendering process can be utilized that dedicates more processing resources to sampling and/or interpolating rays from the light field $L(u,v,s,t)$ to generate views for display in viewing zones that are likely to be observed by a viewer's retina, while rays that are unlikely to be visible to an observer may involve fewer processing resources.

In certain embodiments, the computational resources dedicated to the rendering of particular views can be modulated by controlling the density with which rays are sampled in angle and/or space. In addition, computational resources can be modified by controlling the resolution with which a particular view is rendered. In rasterization embodiments, the sampling of the (u,v) and/or (s,t) plane—that is, the spatial resolution of individual views, or the angular spacing between adjacent views—may be modified to allocate more resources to rays that are likely to be observed, and less resources to rays that are likely to fall between viewers. In raytraced embodiments, the density of rays sampled may be adjusted to prioritize rays intersecting with the areas around tracked eye positions. Given the compute resources required to trace a fixed number of rays, when the eye position has higher confidence, more rays passing through a smaller sphere of space may be traced. If the eye position is known only with lower precision, the sphere around the likely eye position will expand and the same number of rays may be distributed across a larger space. Accordingly, light field displays in accordance with many embodiments of the invention can allocate a given amount of total rendering capacity per frame based upon a set of tracked viewpoints and the confidence of the tracking information.

As is discussed further below, light field displays in accordance with many embodiments of the invention can utilize tracked eye and/or gaze locations to reduce computational complexity and/or reduce rendering artifacts. In a number of embodiments, the goal of the rendering process is to utilize eye tracking information to render views so that viewers perceive correct motion parallax, perspective, stereo disparity (i.e., vergence), and accommodation. In addition, the rendering process should limit and/or eliminate ghosting between overlapping views and provide a stable viewing experience that avoids views changing over time in the absence of change in the viewer's eye locations. Rendering processes in accordance with various embodiments of the invention are discussed below.

Eye Position Dependent Rendering

Figure 7:
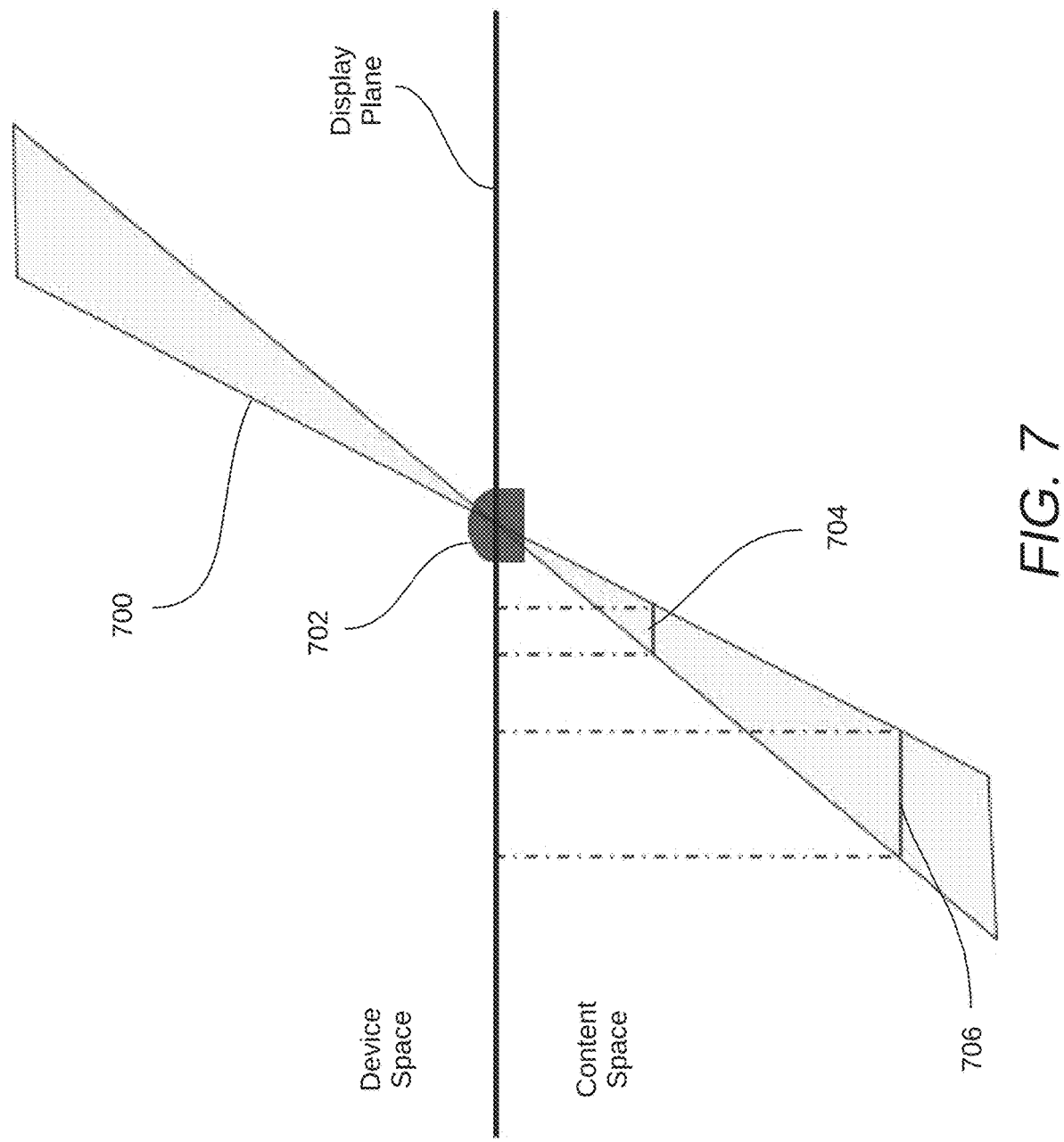
FIG. 7 conceptually illustrates a cone of light generated by an emitter in a light field display, in accordance with an embodiment of the invention.

In a perfect light field display, each angular pixel would include an infinite number of light emitters. While light field displays in accordance with many embodiments of the invention can include an order of magnitude more emitters than conventional multiview autostereoscopic displays, the pitch of the emitters is still non-zero and so the viewings zones are quantized across the field of view of the display and not smoothly continuous. As such, each emitter corresponds to a cone of light generated by the display as is conceptually illustrated in FIG. 7. A light cone 700 produced by emitter 702 corresponds to a cone of directional light from a single pixel (e.g., including an array of light emitters) contributing to an image viewed in a particular viewing zone in device space shown above a display plane in FIG. 7. A challenge faced by conventional multiview autostereoscopic displays is that the spatial resolution with which angular pixels represent a scene is depth dependent. In other words, the spatial resolution is higher at a location closer to the display plane as compared to at a location farther from the display plane. As can be appreciated from FIG. 7, the light cone 700 produced by the emitter 702 corresponds to a narrower region at a depth plane 704 closer to the display plane than a region at a depth plane 706 further from the display plane. It is noted that a plurality of emitters 702, such as in a two-dimensional array, are assumed to be disposed in the display plane to contribute to light field images projected therefrom. In other words, the size of the smallest visible detail is related to distance from the display plane such that finer details of an object located at depth plane 704 closer to the display plane in content space would be visible than for an object located at depth plane 706 further from the display plane. Therefore, objects in the foreground located within a depth budget of the display (i.e., near depth plane 704) can be rendered with finer detail than objects in the background (i.e., at depth plane 706). As a result, generation of images for multiview autostereoscopic display typically involves sampling a scene with a spatial frequency that decreases with increased distance from the display plane.

Figure 8:
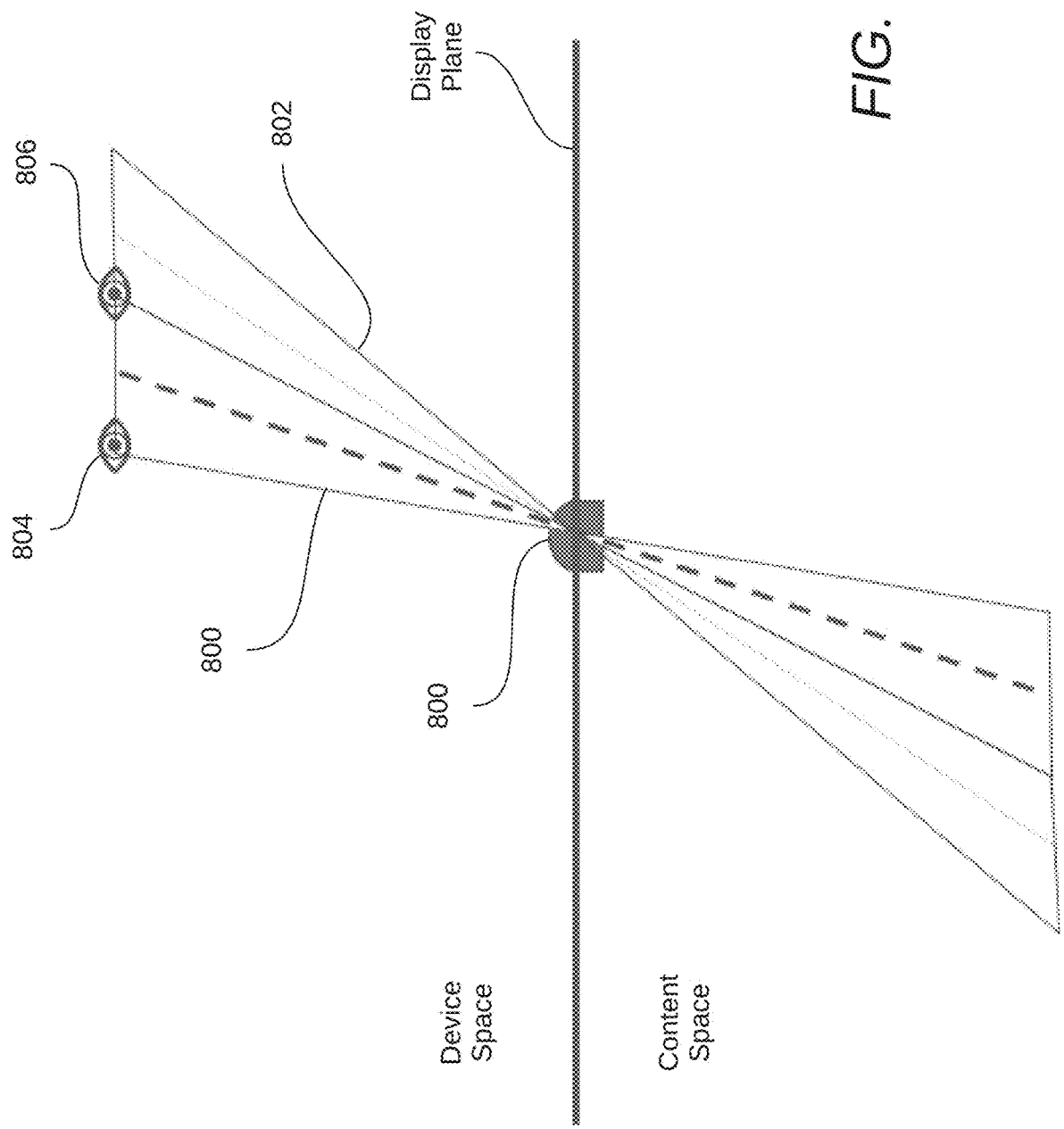
FIG. 8 conceptually illustrates a manner in which aliasing can result in a viewer perceiving background discontinuities in views produced by an autostereoscopic display.

Decreasing the spatial sampling frequency of a highly textured scene (e.g., a scene in which the background includes a great deal of fine detail) can result in aliasing, which can be detrimental to the viewing experience. In the context of autostereoscopic displays, aliasing is typically perceived as discontinuities or jumps in the background of the scene as a viewer moves between adjacent viewing zones. The effect of these discontinuities is that viewers do not experience realistic motion parallax as their eyes move within and between viewing zones. An exemplary manner in which aliasing results in a viewer perceiving background discontinuities is conceptually illustrated in FIG. 8. Different emitters in an angular pixel produce first and second light cones 800 and 802, respectively, corresponding to the same pixel location in images within adjacent, first and second viewing zones 804 and 806, respectively. When the images that are produced in the adjacent viewing zones contain aliasing, the viewer will experience a discontinuity in the viewed scene as their eye moves from the first viewing zone 804 to the second viewing zone 806, even if the imaged scene remains stationary between the two view zones.

Aliasing can be somewhat addressed through pre-filtering, which removes high-frequency components of the scene likely to introduce aliasing. Application of a pre-filtering process can result in images displayed by a multiview autostereoscopic display having blurred backgrounds that are consistent as the viewer moves between adjacent viewing zones. The effect of application of a depth-dependent pre-filter (often referred to as a depth-dependent anti-aliasing filter) to an image of an object in the foreground with a detailed background results in a blurring of the detail of the background as well as potentially a reduction in the detail of the foreground object. Such loss of image fidelity due to pre-filtering is often undesirable. However, systems and methods described herein can reduce effects of aliasing resulting from the viewer moving from one viewing zone to the next by adjusting the displayed image at adjacent viewing zones according to the location of the tracked eyes of the viewer.

Figure 9:
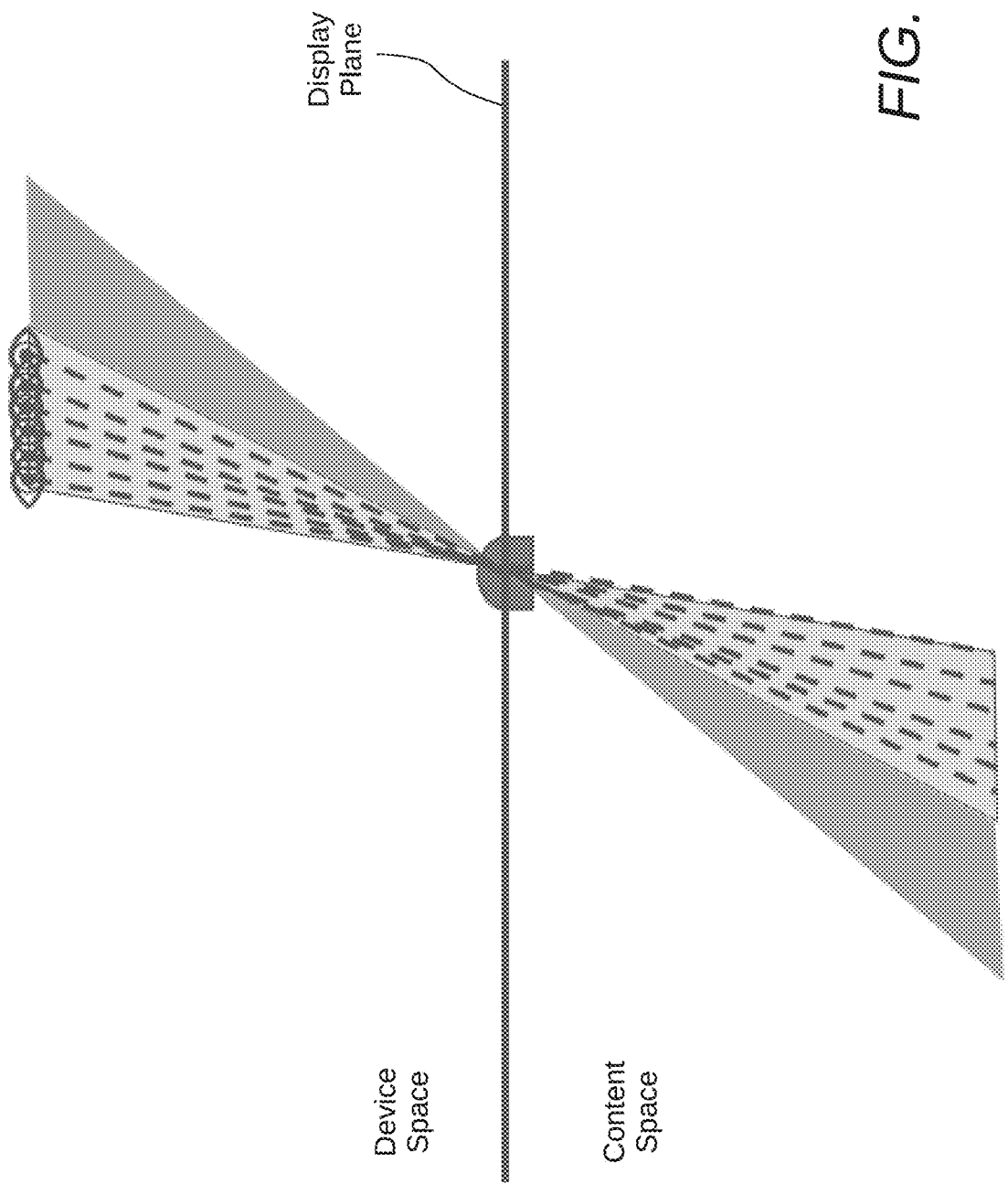
FIG. 9 conceptually illustrates display of views rendered based on tracked locations of a viewer's eye within a viewing zone of an autostereoscopic light field display, in accordance with an embodiment of the invention.

In another example, systems and methods in accordance with a number of embodiments of the invention can increase motion parallax accuracy by utilizing eye tracking data to modify the image perceived by a viewer as the viewer moves within a viewing zone and between viewing zones. The process is conceptually illustrated in FIG. 9. As the viewer's eye moves across a viewing zone within the left light cone shown in FIG. 9, the location of the eye is tracked by an eye tracking mechanism integrated with the light field display such that the scene is resampled from the new viewpoint of the viewer's eye in motion. The light field display can then modify the intensity of the directional light from the emitter array within the light field display to display the resampled image at each eye location. By resampling the scene as the viewer moves, the scene is effectively sampled at a higher spatial frequency than the angular resolution of the viewing zones of the display. In this way, similarly to the process above with to mitigate aliasing, instead of abrupt transitions between viewing zones, near continuous resampling of the scene based upon the location of the viewer's eyes can result in smooth transitions between adjacent viewing zones. Resampling the scene and updating the display accordingly enables the light field display to reduce the extent of or eliminate entirely the background discontinuities that would otherwise result due to aliasing, even without application of a depth-dependent anti-aliasing filter.

In addition to resampling the scene and updating the view that is rendered as a viewer moves within a viewing zone and even across adjacent viewing zones, aliasing artifacts can be further reduced by managing the depth at which various objects within a scene are rendered. In a number of embodiments, the depth information of a scene is modified during rendering by the light field display so that most of the content of the scene is located at the plane of the light field display. In several embodiments, objects within the scene are flattened during rendering so that they are positioned more closely together along an axis extending in a direction from the center of the display to the viewer. In this way, the scene is flattened in a different manner during rendering for each viewer depending on the viewer location. The effect of the flattening is to increase the sharpness of the rendered view and to decrease aliasing. When flattening is viewpoint dependent, the flattening process can preserve consistency between object placement as a viewer moves to mimic expected motion parallax. The extent to which depth information assigned to objects within a scene is modified during the rendering process is largely dependent upon the requirements of a specific application.

Uncertainty in eye tracking location information can result in rendering a view for display within a viewing zone that is from a perspective that is different from the actual viewpoint of one or both of the viewer's eyes. As a viewer moves, the viewer expects to observe motion parallax. The amount of the motion parallax observed is typically dependent upon the amount of movement. Where an initial view is rendered based upon an error in eye tracking location and a subsequent view is rendered in a manner that corrects for tracking error, the extent of the motion parallax from the initial view to the corrected view may appear greater than the viewer expects based upon the extent of their body movement.

In order to preserve realistic motion parallax, light field displays in accordance with a number of embodiments of the invention render sequences of views based upon relative motion between tracked eye locations as opposed to absolute eye tracking locations. In this way, the views can be rendered in a manner that results in motion parallax corresponding to the extent of the viewer's movements. For example, when the viewer looks away from a tracked eye location, moves their eyes rapidly, and/or blinks, the light field display can update the tracked eye locations to eliminate accumulated tracking errors. In several embodiments, the light field display can determine the perspective from which to render a view in a manner that is dependent both on absolute tracked eye location and the extent of eye movement to correct for previous errors in eye tracking over time. In many embodiments, the correct perspective is restored when the content itself is rapidly changing over a sequence of frames. Any of a variety of processes that accommodate rendering views from the actual tracked eye locations and/or preserve the accuracy of the motion parallax experienced as the user moves can be utilized as appropriate to the requirements of specific applications in accordance with various embodiments of the invention.

Further, depth cues observed by a viewer include the extent of the stereo disparity between views rendered for each of a viewer's eyes. The extent of the stereo disparity rendered between the views is typically dependent upon the baseline distance between the viewer's eyes or inter-pupil distance (IPD). In a number of embodiments of the invention, tracking of a viewer's eyes is performed in a manner that imposes a requirement of near constant IPD for each viewer. In this way, tracking uncertainty can be constrained in a manner that enforces consistency of stereo disparity depth cues between the views rendered for display in the viewing zones occupied by each of a viewer's eyes even as the viewer's eyes are in motion.

Additionally, a sequence of views can be rendered based upon the tracked locations of the viewer's eyes. In many embodiments, the manner in which a time sequence of views is rendered can account for the extent of motion parallax expected to be observed by a viewer based upon the viewer's movements.

In some instances, a viewer's pupil may span multiple, potentially overlapping viewing zones. In which case, light field displays in accordance with many embodiments of the invention can render multiple eye/pupil position dependent views for display in the multiple viewing zones visible to a viewer's eye. When views are rendered in different viewing zones visible to a viewer's eye in a manner that is inconsistent, the viewer can perceive ghosting. When the multiple views that are visible to a specific eye are rendered in a way that causes all of the views to move in a manner that is consistent, the views can provide accommodation depth cues. Accordingly, light field displays in accordance with many embodiments of the invention support one or more modes, in which the same view is displayed within overlapping viewing zones visible to an eye, or different views containing accommodation cues (e.g., rendered so that the angular distance between the views is the same as the angular distance between the viewing zones) are displayed in overlapping viewing zones. When only a portion of a viewing zone intersects a viewer's pupil, the angular distance between that viewing zone and the neighboring viewing zone can be determined from the center of the segment of the viewing zone visible to the pupil. As with the scenarios described above, the rendering can also consider the inter-pupil distance and relative location of the tracked eyes to preserve the consistency between motion parallax depth cues and stereo depth cues present in the views rendered by the light field display.

Figure 10:
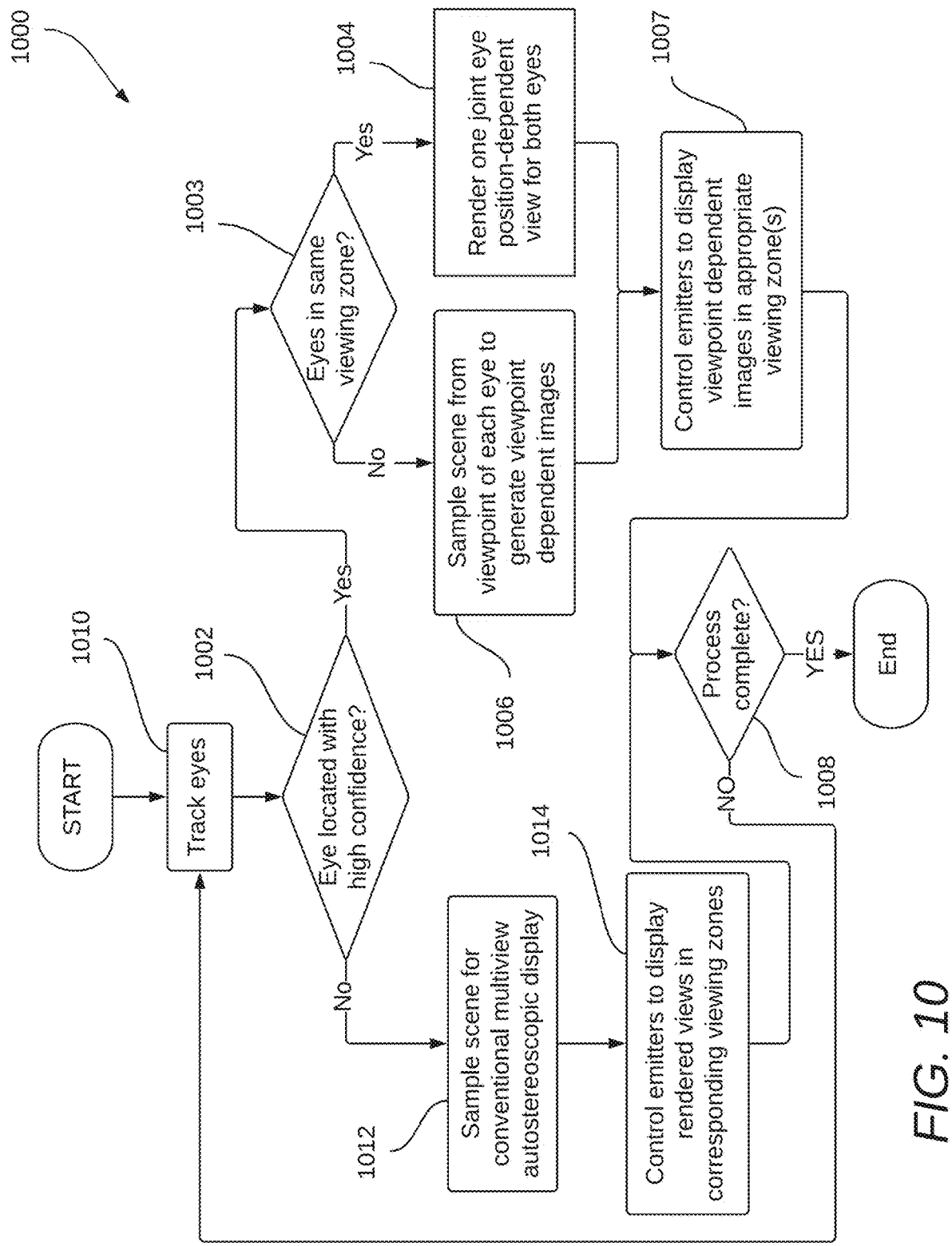
FIG. 10 illustrates a process of operating a light field display to modify the views displayed in viewing zones occupied by the eyes of a viewer based upon the tracked locations of the eyes of the viewer, in accordance with an embodiment of the invention.

A process that can be utilized by a light field display to modify the view displayed in viewing zones occupied by the eyes of a viewer based upon the tracked locations of the eyes of the viewer in accordance with an embodiment of the invention is shown in FIG. 10. According to the tracked location of the viewer's eyes, the light field display's processing system can render views of a scene for display in a manner that is viewpoint dependent. While process 1000 illustrated in FIG. 10 is focused on eye tracking for a single viewer, process 1000 can be expanded to multiple viewers, provided additional capabilities to separately track the eyes of multiple viewers are available. The process 1000 includes attempting to track the location of the eyes of a viewer in a step 1001. When a determination 1002 is made that the viewer's eyes have been located with high confidence, process 1000 proceeds to a decision 1003 to determine whether both of the viewer's eyes are within the same viewing zone.

If decision 1003 determines that both of the viewer's eyes are within the same viewing zone, then the process can render a single, joint eye position-dependent view for both eyes in a step 1004. In a number of embodiments, the joint eye position-dependent view can be rendered based upon a mid-point between the two tracked eye locations (potentially constrained by a viewer specific inter-pupil distance).

If decision 1003 determines that each eye of the viewer is located within a different viewing zone, then unique eye/pupil position dependent views can be rendered for each eye by sampling 1006 the scene from the viewpoint of each of the viewer's eyes. In several embodiments, the sampling 1006 of the scene is constrained to restrict the angular distance between the rendered views to correspond to a viewer-dependent inter-pupil distance to increase the consistency of the stereo disparity depth cues perceived by the viewer with other depth cues including (but not limited to) motion parallax depth cues.

Whether or not the viewer's eyes are located within the same viewing zone, the views rendered in step 1004 or 1006 can then be used to control 1007 the activation of the emitters within the light field display that display viewpoint-dependent images within the appropriate viewing zone(s) occupied by each of the viewer's eyes. In this way, the views displayed to the viewer are not only dependent upon the specific viewing zones occupied by the viewer's eyes but the tracked locations of the viewer's eyes within those viewing zones.

Returning to determination 1002, if neither of the viewer's eyes has been located with high confidence, then sampling 1012 of the scene is restricted to rendering for a conventional multiview autostereoscopic display. In other words, a determination 1002 that no eye can be detected and/or that the noise or uncertainty in tracked eye locations is high can result in the light field display sampling the scene for a conventional multiview autostereoscopic display, in which different views are displayed in each viewing zone across the field of view of the light field display in a manner in which the view in a particular viewing zone does not change based upon the location of a viewer's eye within the viewing zone. When eye tracking is uncertain, attempting to render views in a viewpoint dependent manner can make the perceived experience of a light field display worse than simply rendering the views in the manner of a conventional multiview autostereoscopic display. In several embodiments, the light field display can respond to an absence of a tracked eye within a viewing zone or a loss of reliable eye tracking by controlling the emitters to function in a manner similar to a conventional 2D display in which the same view is displayed in each viewing zone that does not contain a tracked eye. Then, the emitters of the light field display are controlled 1014 to display the rendered views from step 1012 in corresponding viewing zones. In a number of embodiments, the light field display displays autostereoscopic views rendered with coarser spatial resolution and/or stereopsis in viewing zones that do not contain a tracked eye.

Processes in accordance with various embodiments of the invention can render views in a manner that is dependent upon the uncertainty with which the eyes of multiple viewers are tracked and/or the uncertainties introduced by potentially overlapping viewing zones in non-ideal light field displays are discussed further below.

The process of tracking 1001 the viewer's eyes, rendering 1004 or 1006 or 1012 the scene, and controlling 1007 or 1014 the display can be repeated until a determination 1008 is made that the process is complete (e.g., a user instruction deactivating the display or no user detected for user instructions received for a period of time).

While the discussion above primarily focuses on the display of autostereoscopic views in viewing zones occupied by tracked eyes of a single viewer, the ability to track the eyes of multiple viewers and render views specific to the viewing zones occupied by each viewer's tracked eyes enables light field displays in accordance with many embodiments of the invention to display different scenes to different viewers. For example, multiple viewers could play a multiplayer video game and each viewer of the light field display will perceive a different scene. The circumstances in which it can be beneficial for a light field display to render and display different scenes for different viewers are not limited to gaming, and a decision concerning the displays to present distinct content to individual viewers is only limited by the requirements of specific applications, in accordance with various embodiments of the invention. Alternatively, light field displays in accordance with several embodiments of the invention can support a mode in which each viewer sees a preferred viewpoint. The ability to display the same viewpoint to all viewers may be useful for applications including (but not limited to) training presentations and/or display of legacy stereo content for which insufficient depth information is available for full light field display.

When eye trackers are unable to track a viewer's eyes (e.g., no viewer is detected and/or the eye tracker loses tracking on one or both of the viewer's eyes), light field displays in accordance with many embodiments of the invention can fall back to a number of different modes as appropriate to the requirements of specific applications.

Reducing Optical Crosstalk Between Viewing Zones

Due to manufacturing tolerances, optical components utilized within light field displays, such as microlenses used to implement angular pixels, can include aberrations that can cause light from an emitter to leak into ray directions other than the primary intended direction of the light emission. Leakage of light from an emitter into multiple ray directions is considered to be a form of optical crosstalk resulting in overlapped light cones between adjacent viewing zones. In a number of embodiments, emitters are jointly controlled to achieve desired performance from a light field display. In several embodiments, the emitters are jointly controlled to achieve a target light field. In a number of embodiments, the emitters are jointly controlled to display particular views within specific viewing zones based upon information including eye tracking information. In certain embodiments, the emitters are jointly controlled, subject to constraints related to minimum and/or maximum permitted emitter intensities. Various joint control processes that can be implemented in light field displays in accordance with various embodiments of the invention to reduce optical crosstalk are discussed below.

In many embodiments, the emitters of an angular pixel are controlled so that the intensity of the angular pixel in one or more specific ray directions is as close as possible to a target intensity. In several embodiments, the matching of the emitted intensity with the target intensity is achieved by controlling the intensities of each of the jointly controlled emitters so that the linear combination of the emitted intensities of the emitters in the one or more specific ray directions are as close as possible to their target intensities. As is discussed below, the one or more specific ray directions can be determined using eye tracking information to identify ray directions that contribute to displays in particular viewing zones that are visible to viewers' eyes.

In a number of embodiments, a calibration process can be performed to determine the contribution of individual emitters to specific ray directions. As is discussed further below, the calibration may also address the contribution to individual emitters to specific regions of a view displayed within one or more particular viewing zones. The calibration data can be used to define a mixture matrix for an angular pixel. In several embodiments, the mixture matrix maps emitter intensities to each ray direction. In many embodiments, the calibration process used to develop mixture matrices is not performed with respect to each light field display. Instead, a representative light field display can be characterized to develop mixture matrices for its angular pixels. These mixture matrices can then be utilized directly by other light field displays or with modifications determined by a second calibration process specific to the particular light field display utilizing the calibration information. In several embodiments, the calibration data can be temperature dependent and temperature sensors and/or other environment sensors are provided across the display to enable selection of appropriate calibration data.

When a mixing matrix is defined for an angular pixel, the intensities of the emitters that can achieve target intensities in a set of specific ray directions can be determined by inverting the mixture matrix. Multiplying the inverted mixture matrix by a set of target intensities in specific ray directions can result in a set of emitter intensities that are not physically achievable in the real world. For example, multiplying a set of target intensities in specific ray directions by the inverted mixture matrix may result in negative intensities and/or intensities that are larger than the intensities that can actually be generated by the emitters. In a number of embodiments, constraints are placed on the permitted target intensities to increase the likelihood and/or guarantee that the control process generates physically achievable emitter intensities. In certain embodiments, target intensities are constrained to be between a minimum value that is greater than zero and a maximum value that is less than the maximum achievable emitter intensity. The minimum target intensity allowed determines the black level of the display. Furthermore, the maximum target intensity allowed determines the dynamic range of the light field display.

In many embodiments, the emitter intensities of an angular pixel can be determined using an optimization process that seeks to minimize the difference for a set of ray directions f between the target intensity $L_T(\omega)$ of that angular pixel in the ray direction w E f and the product of the emitter intensity $L_A(x,\omega)$ at particular emitter location x in ray direction $\omega$ multiplied by the mixture matrix A for the angular pixel. The optimization function can be formulated as follows:

$$\min_{\forall \omega \in \Omega} \mathcal{L}(\omega)$$

where, $$\mathcal{L}(\omega) = \sum_x \text{Norm}(L_T(\omega) - A_{x,\omega} L_A(x, \omega))$$

and where $A_{x,\omega}$ are the elements of the mixture matrix A.

The distance between a target intensity in a particular ray direction and the linear combination of the emitter intensities in that ray direction can be determined using any of a variety of distance metrics including (but not limited to) the $L_1$ norm and/or the $L_2$ norm. In certain embodiments, the emitter intensities can be determined using a process that optimizes the emitter intensities based upon a neural network that is trained to generate an output indicative of perceived image quality. Any of a variety of objective functions can be utilized in the optimization of emitter intensities of an angular pixel as appropriate to the requirements of specific applications in accordance with various embodiments of the invention.

In several embodiments, the optimization is a constrained optimization that attempts to minimize the differences between the emitted intensities in specific ray directions and desired target intensities, but subject to specific minimum and maximum permitted target intensities. In this way, image quality can be traded off against the black level and/or the dynamic range of the display. The tradeoff between image quality and the black level and/or the dynamic range of the display can be determined dynamically in response to factors including (but not limited to) the content displayed, the number of viewers, and/or ambient lighting conditions. Furthermore, any of a variety of other alternative and/or additional constraints can be utilized to determine the manner in which to control emitter intensities of angular pixels in a light field display as appropriate to the requirements of specific applications in accordance with various embodiments of the invention.

While much of the discussion above relates to controlling emitters in a single angular pixel based upon desired target intensities in a set of ray directions, light field displays in accordance with many embodiments of the invention can jointly control the emitters in multiple angular pixels based upon desired target intensities in a set of ray directions. A control process can be performed in which the sum of the contributions in a particular ray direction w are determined are summed across the emitters of multiple angular pixels (as opposed to the emitters of a single angular pixel). Typically, a number of angular pixels will contribute to the perceived intensity of a pixel within a particular viewing zone. The number of angular pixels that contribute to the perceived intensity of a pixel within a particular viewing zone is typically dependent on the distance of the viewer from the light field display. For example, when the viewer is far from the light field display the number of angular pixels that include emitters that contribute to the perceived intensity of a pixel within a viewing zone occupied by an eye of the viewer is greater than when the viewer is closer to the light field display.

In a number of embodiments, eye tracking information is utilized to determine viewing zones in which tracked eyes are located (or are likely to be located). This information can then be utilized to determine a set of ray directions for various angular pixels within the light field display that contribute to the views displayed in the viewing zones in which tracked eyes are or are likely to be located. As noted above, the distance of the viewer from the light field display can cause the light field display to treat multiple angular pixels as contributing to the emitted intensity in a particular ray direction to reduce the computational complexity of jointly controlling the emitters within the light field display. In addition, the target intensities for each ray direction in the set of ray directions for the various angular pixels can be defined. The target intensities for the set of ray directions can then be utilized to jointly control the emitters in one or more angular pixels to provide emitted intensities that achieve a pre-determined objective relative to the target intensities using a process similar to any of the processes outlined above.

While various processes are described above for jointly controlling emitters within a single angular pixel and/or set of angular pixels to achieve specific goals with respect to the display of one or more views within one or more viewing zones, any of a variety of processes can be utilized to determine the manner in which to jointly control the intensities of emitters within one or more angular pixels as appropriate to the requirements of specific applications in accordance with various embodiments of the invention.

Reducing Ghosting Using Eye Tracking

In light field imaging, a light field image is formed within a specific viewing zone by various angular pixels emitting light in a set of ray directions that combine to form a view within the viewing zone. The angular pixel does not, however, emit light in a singular ray. Rather, the angular pixel emits a light cone in a specific ray direction. If the light cones of neighboring ray directions do not overlap, it would be easy to compute how much light each angular pixel should emit to best approximate the light field that the display should ideally create. However, in practice the light cones of neighboring ray directions overlap with increased distance from the light field display. As noted above, some light may leak to other, non-obvious directions due to scattering and imperfections in the optical components of the display.

A form of optical crosstalk that is often referred to as ghosting or leakage can result when a viewer perceives multiple views displayed in overlapping viewing zones. The term ghosting is typically utilized to refer to a phenomenon whereby a viewer's eye is located in overlapping viewing zones in which different views are displayed and so the viewer perceives a doubling of the image or "ghosting." The term ghosting is most often used in the context of stereoscopic displays to refer to a phenomenon where Left and Right images are presented to a viewer and at least one of the viewer's eyes perceives both the Left and Right images (instead of the left eye seeing the Left image and the right eye seeing the Right image in isolation). In the context of a multiview autostereoscopic display, ghosting can manifest as a result of an eye seeing multiple images from adjacent viewing zones. In a number of embodiments, eye tracking information is utilized to reduce the extent to which viewers of a multiview autostereoscopic display experience ghosting.

Figure 11:
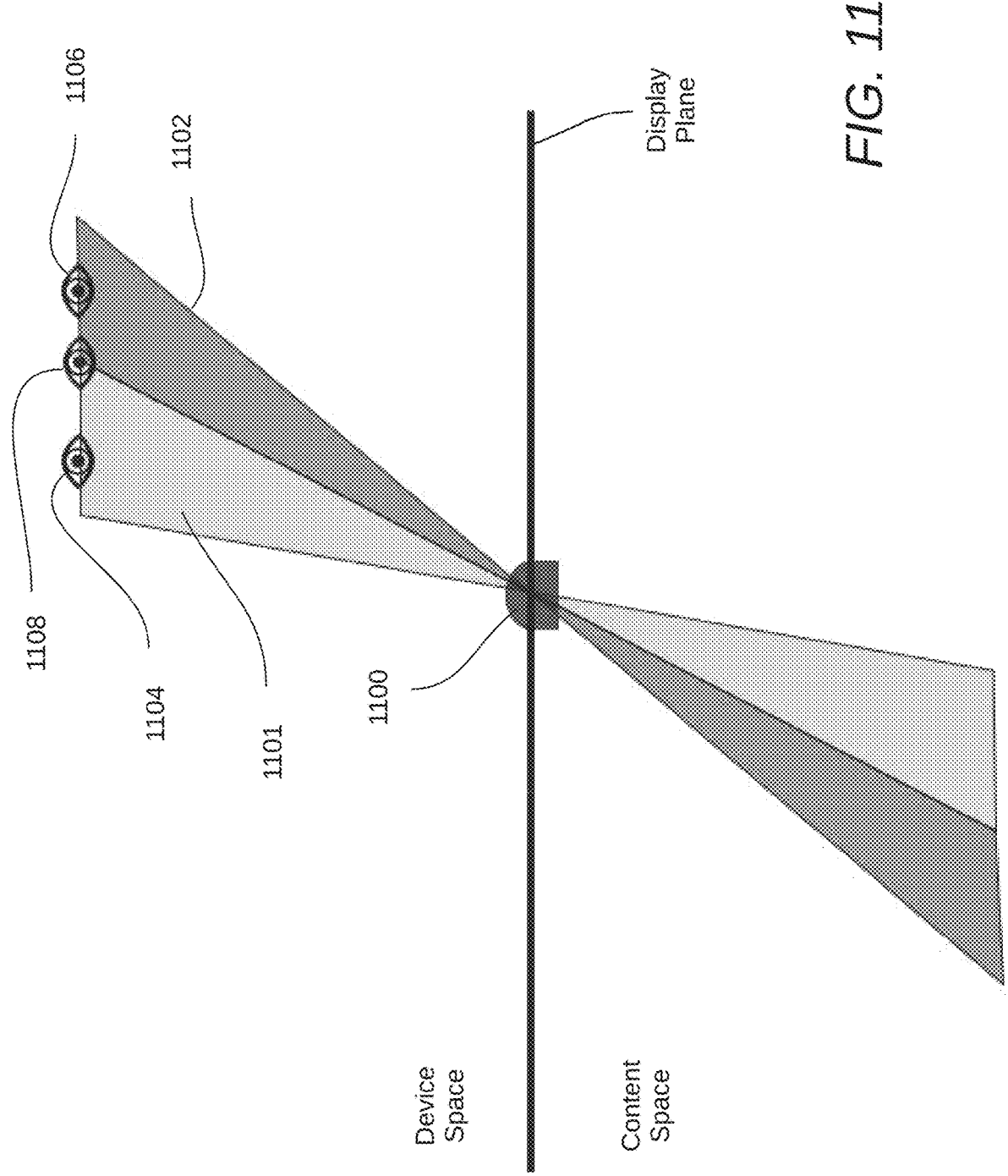
FIG. 11 conceptually illustrates the phenomenon of ghosting.

The phenomenon of ghosting is conceptually illustrated in FIG. 11. In the illustrated example, emitters in an angular pixel 1100 produce light cones 1100, 1102 that contribute to views displayed in adjacent viewing zones. In the illustrated example, the optical system of the angular pixel is assumed perfect and the two light cones 1101 and 1102 are non-overlapping. In many embodiments, the light cones 1101 and 1102 are likely to be overlapping. As the viewer's eye moves from the first viewing zone 1104 to the second viewing zone 1106, the viewer's eye occupies a ghosting zone 1108 in which the eye simultaneously perceives the views displayed in the two adjacent viewing zones 1104, 1106. The extent of the discomfort and/or perceived image degradation that results from the ghosting will typically depend upon the similarity between the views displayed in the adjacent viewing zones. In a number of embodiments, information regarding ghosting can be utilized to determine the target intensities in specific ray directions and this information can then be utilized in processes similar to those described above to jointly control the emitters within the various angular pixels of the light field display to reduce ghosting.

Figure 12:
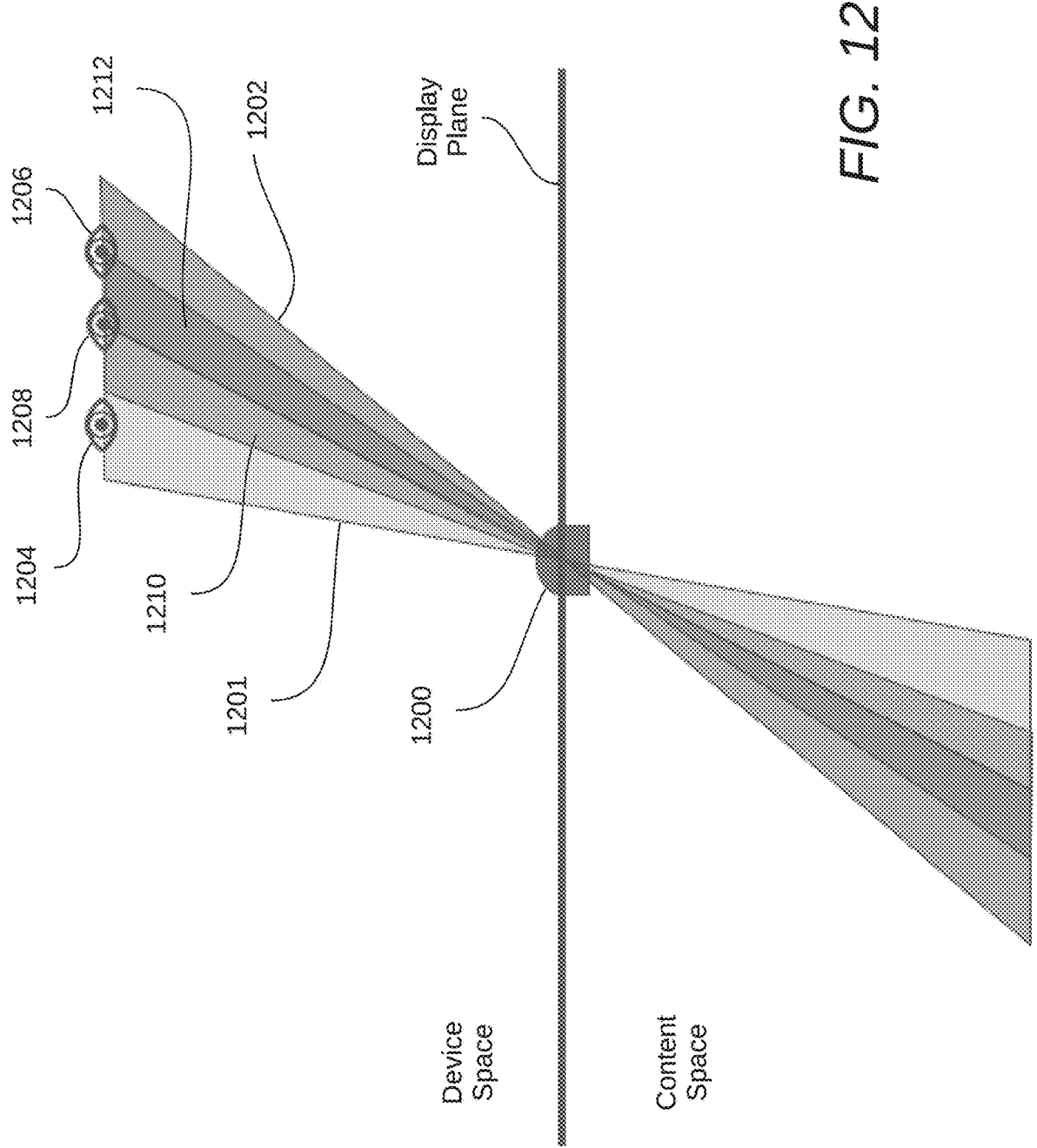
FIG. 12 conceptually illustrates a process that can be utilized by a light field display to render the images displayed in viewing zones based upon eye tracking information to reduce ghosting, in accordance with an embodiment of the invention.

A process that can be utilized by a light field display to render the images displayed in viewing zones based upon eye tracking information to reduce ghosting in accordance with an embodiment of the invention is conceptually illustrated in FIG. 12. The optical system of the angular pixel 1200 is shown as perfect and the two light cones 1201 and 1202 are non-overlapping. As noted above, light cones 1201, 1202 are likely to be overlapping in practically implementable light field displays. When the viewer's eye is located in a ghosting zone 1208, the eye simultaneously perceives the views displayed in the two adjacent viewing zones 1204, 1206. In a number of embodiments, the light field display can cease displaying different views in the two adjacent viewing zones 1204, 1206 and instead display the same view in light cones 1210 and 1212 as the viewer's eye travels between viewing zones 1204 and 1206. As noted above, the view that is displayed in the two adjacent viewing zones 1204, 1206 can be rendered based upon the specific location of the viewer's eye to reduce aliasing. Alternatively, the light field display can render different views in the light cones 1210 and 1212 that superimpose in such a way that the sum of the views creates a desired view at the location of the viewer's eye.

FIG. 12 illustrates a simple example of ghosting reduction, in accordance with an embodiment. In many instances, multiple viewing zones overlap and the intensities of the angular pixels of the light field display are determined so that the sum of the views perceived by a viewer's eye closely matches a desired view. Light field displays described herein can offer display modes including (but not limited to) a mode in which overlapping viewing zones display the same view rendered in a viewpoint dependent manner and/or a mode in which different views are displayed in overlapping viewing zones in a manner that results in the sum of the views at a particular viewpoint corresponding to a desired view.

Figure 13:
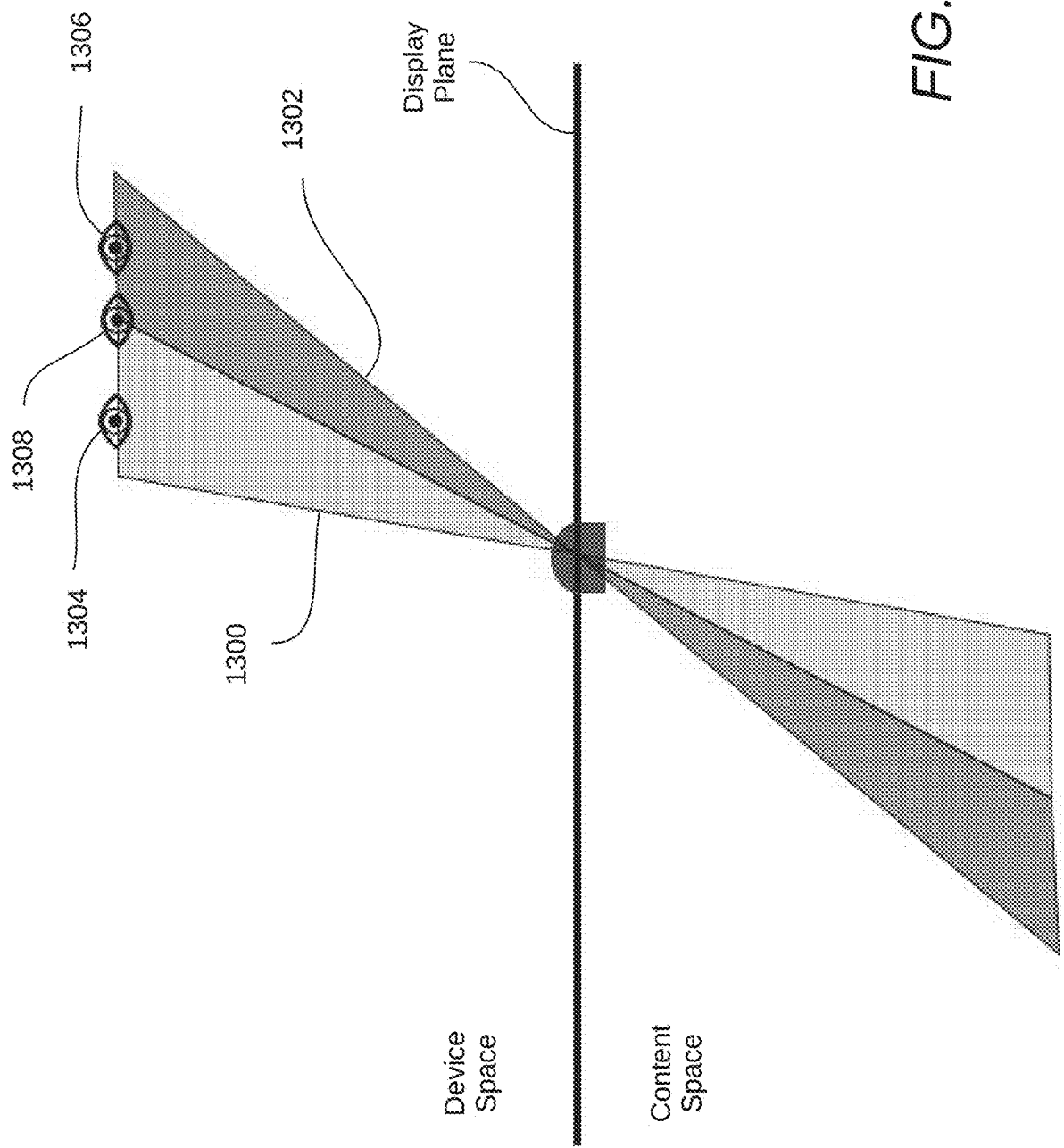
FIG. 13 illustrates a manner in which uncertainty in eye tracking can be accommodated by displaying the same color and intensity in viewing zones adjacent to tracked eyes, in accordance with an embodiment of the invention.

Referring now to FIG. 13, in a number of embodiments, uncertainty in eye tracking can be accommodated by using angular pixel 1300 to always display the same color and intensity 1301, 1302 in viewing zones 1304, 1306 adjacent to tracked eyes in the manner illustrated in FIG. 13. Maintaining consistent color across adjacent viewing zones 1304, 1306 can be achieved by controlling emitters within angular pixels so that adjacent emitters display the same color, as an emitter used to display an image within a viewing zone occupied by a tracked eye. In this way, even when the eye is located in viewing zone 1308 between adjacent viewing zones 1304 and 1306, the tracked eye sees consistent colors, thus reducing aliasing and other undesirable effects. While the conceptual illustration in FIG. 13 shows the color of the emitters as being invariant based upon the position of the viewer's eye, in many embodiments the color varies as the viewer's eye moves to reduce aliasing in the manner described above. The light field display (formed of a plurality of angular pixels 1300, simply controls adjacent emitters so that they produce the same color as the view that is displayed changes based upon the tracked eye location.

Accordingly, light field displays in accordance with several embodiments of the invention utilize a process similar to the process shown in FIG. 10 above to render views for display in viewing zones occupied by tracked eyes and control the emitters so that the same view is displayed in adjacent viewing zones. While the embodiments discussed above with reference to FIGS. 12 and 13 illustrate two adjacent viewing zones, it should be appreciated that light field displays in accordance with many embodiments of the invention can control emitters so that views displayed in more than two adjacent or overlapping viewing zones are the same for reasons including (but not limited to) the reduction and/or elimination of ghosting.

While much of the discussion above focuses on the reduction and/or elimination of ghosting, another advantage of displaying the same view in adjacent viewing zones/ controlling adjacent emitters to produce the same color is that the light field display's image quality becomes more robust to errors in eye tracking information and/or intra-microlens crosstalk. When the same view is displayed in adjacent viewing zones, errors in the eye tracking information do not carry an inherent risk of ghosting (e.g., due to the light field display being unaware that the viewer's eye is actually located within a ghosting zone and perceiving two different views). In addition, intra-microlens crosstalk between adjacent emitters (discussed in further detail below) does not result in a degradation of the perceived image quality as the emitters produce the same colors.

While a number of processes are described above for addressing ghosting, any of a variety of techniques for addressing ghosting can be utilized as appropriate to the requirements of specific applications in accordance with various embodiments of the invention. In a number of embodiments, calibration information concerning the extent of the overlap between adjacent viewing zones can be utilized to render views in adjacent viewing zones that combine in a manner that creates a consistent view for the viewer. In this way, the superposition of the overlapping views formed by adjacent emitters can be taken into account in the rendering of views based upon the location of the tracked eye so that the intensity of particular angular pixels is uniform as the eye moves across the field of view of the viewing zones.

Foveated Light Field Rendering Using Gaze Tracking

Computational efficiencies can be achieved when light field displays incorporate gaze tracking hardware in accordance with various embodiments of the invention. In certain embodiments, gaze tracking information can be used to further define the set of ray directions utilized in the joint control of emitters within a light field display to support rendering of foveated views based upon gaze direction as is discussed further below. As noted above in reference to FIG. 6A, eye tracking involves tracking the locations of a viewer's eyes. As shown in FIG. 6B, gaze tracking involves tracking not only where a viewer's eyes are located, but where the viewer is looking. The computational complexity of rendering views for display in viewing zones likely to be perceived by the viewer's eyes (and potentially adjacent viewing zones) can be reduced by only rendering the views with full resolution and disparity information in a foveated region corresponding to the region of the display where the viewer's gaze is likely directed. That is, while the tracking of the viewer gaze may be more involved than eye tracking, the incorporation of gaze tracking into a light field display can reduce the computational complexity of the image rendering by restricting the light field views rendered to only those locations at which the viewer is gazing.

As known in studies, human sensitivity to color information is highest in the center of the retina, generally referred to as the fovea, while retinal acuity and color sensitivity is typically poor away from the center of the retina. However, the ability to sense rapid changes in intensity or movement is highly developed outside the center of the retina. Human sensitivity to stereopsis is highest in a central cone of vision (typically 10°) around the axis of vision; outside this area, depth cues can be reduced for high-frequency content without a significant reduction in the perceived quality of the display. Accordingly, light field displays can use gaze tracking information to identify foveated regions of the views to be rendered for display in the viewing zones occupied by a viewer's eyes. Within the foveated region, i.e., those views viewed by the center of the retina, the views can be rendered at the maximum supported resolution and with stereopsis. Outside the foveated region, the resolution of the image can be decreased and stereopsis need only be maintained with respect to large features or low-frequency content. Gaze information can also be utilized for tone mapping and/or application of depth dependent blur based upon the specific point within a scene to which a viewer's gaze is directed.

In many embodiments, a light field display that employs foveated rendering is able to change the rendered resolution and/or disparity of different regions of the rendered views during saccadic suppression (e.g., when a tracked eye blinks the light field display can acquire new gaze tracking information and render new foveated views prior to the completion of the viewer's saccadic suppression). Alternatively, the light field display can gradually adjust the resolution and/or extent of stereopsis in different regions so as to avoid notice.

In a number of embodiments, light field displays employ foveated rendering in a manner that accommodates uncertainty in the location of tracked eyes and in the determination of the gaze direction of the tracked eyes. Retinal acuity, color sensitivity, grayscale resolution and sensitivity, and time resolution and motion sensitivity with retinal position can be represented as a feature vector. When information concerning the 3D eye position and 2D gaze direction are known, the retinal feature vector can be mapped to a vector field in a 4D ray space. Each ray terminating on the retina and passing through the pupil can be assigned a feature vector value related to the retinal point at which the ray terminates. All rays that do not terminate on the retina can be assigned a vector value of zero. By assigning values in a manner that is dependent upon characteristics of the retina including (but not limited to) acuity and/or color sensitivity, the light field display can render views with the most detail and color on rays originating from angular pixels where the eyes are looking and passing through the pupil. Using the same process, less detail and color can be rendered in regions of views that corresponding to rays originating from angular pixels that are not at the center of a viewer's gaze or that are unlikely to pass through a viewer's pupil. In several embodiments, the rendering accommodates the eye's sensitivity to sudden changes in intensity within peripheral vision by providing smooth transitions for rays outside the center of the viewer's gaze. In certain embodiments, the distance of the viewer from the light field display is also considered and views are rendered with a level of detail appropriate to the level of detail that can be observed at the distance the viewer is located.

Figure 14:
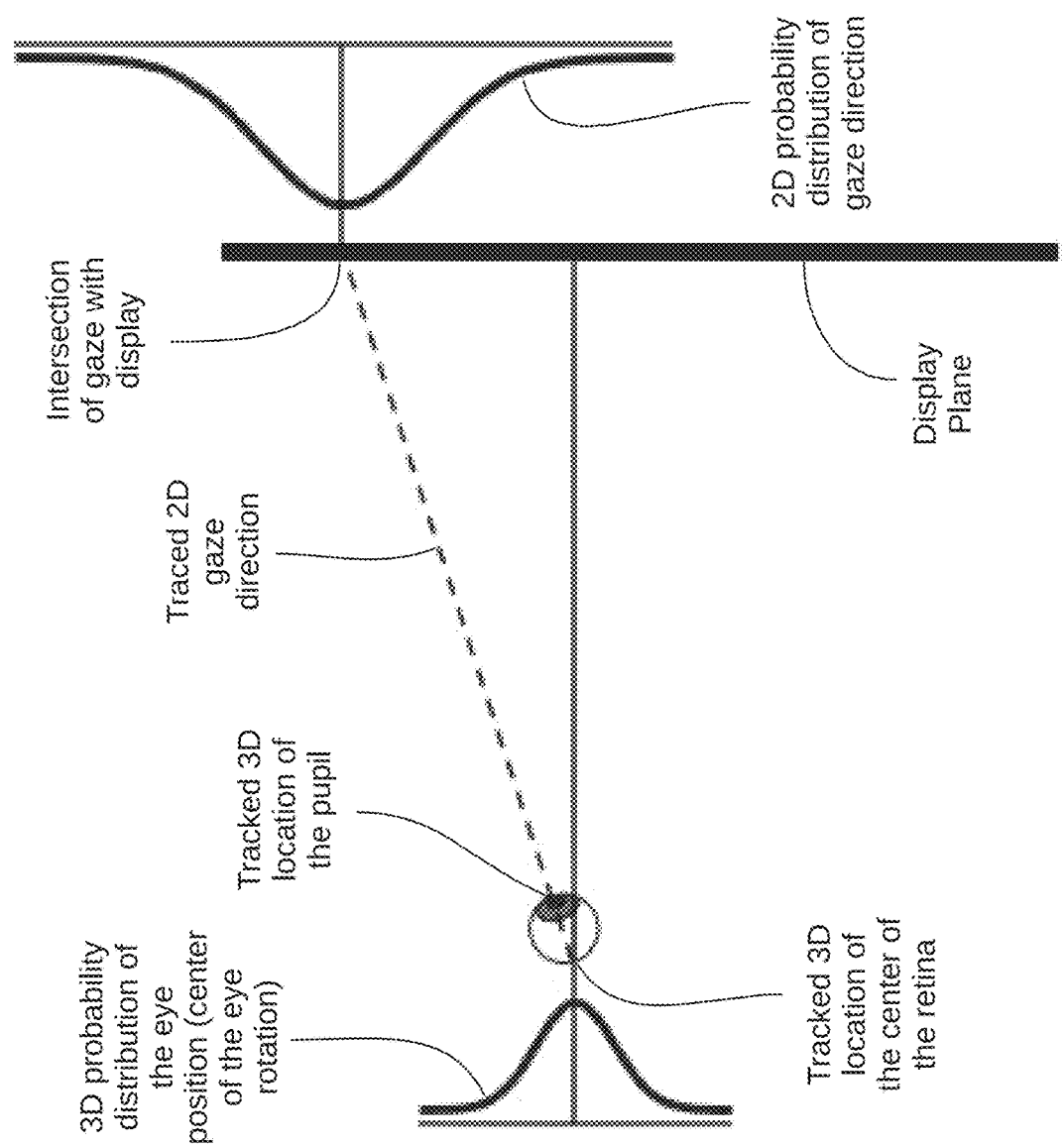
FIG. 14 illustrates a representation of uncertainty in gaze direction and eye position as a 5D probability distribution.

If gaze direction and eye position are not exactly known, the gaze direction and eye position can be represented as a 5D probability distribution (i.e., 3-dimensions related to position and 2-dimensions related to gaze) as illustrated in FIG. 14. In many embodiments foveated rendering can take uncertainty into account by weighting the feature vector field for each eye position and gaze direction with the 5D probability density function and then integrating over the 3D eye positions and 2D gaze directions. The result is a feature vector field $\varphi(x,y,u,v)$ in a 4D ray space defining the importance of each ray from the perspective of all the features. Views can then be rendered by rendering rays based on this resulting feature vector function $\varphi(x,y,u,v)$. The feature vector fields can be aggregated for the multiple eyes of one or more viewers using an aggregation function such as (but not limited to) maximum, mean, or minimum.

Figure 15:
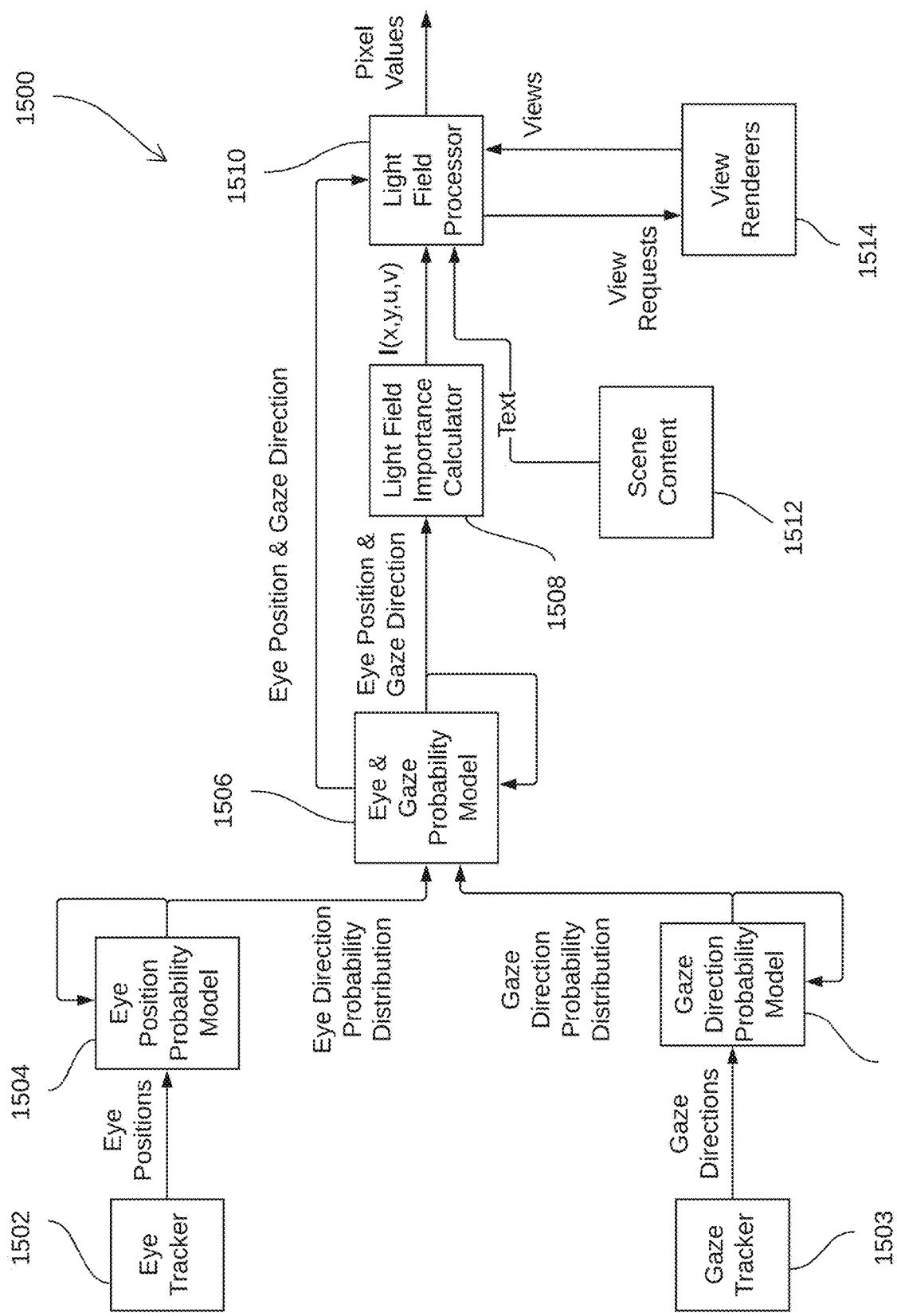
FIG. 15 conceptually illustrates a process for performing foveated rendering with a light field display, based upon eye and gaze tracking information in a manner that accounts for uncertainty in eye and gaze tracking information, in accordance with an embodiment of the invention.

A process that can be utilized to perform foveated rendering based upon eye and gaze tracking information in a manner that accounts for uncertainty in eye and gaze tracking information in accordance with an embodiment of the invention is conceptually illustrated in FIG. 15. The process 1500 accepts as inputs eye positions and gaze directions obtained from eye and gaze tracking systems 1502, 1503, respectively. In a number of embodiments, confidence information with respect to the eye and gaze tracking information can be utilized to generate eye and gaze probability distributions using eye position and gaze direction probability models 1504, 1505, respectively. These distributions can be utilized to generate a combined eye position and gaze direction probability model 1506 that can be utilized in the generation of control information for angular pixels within the light field display. The process of generating the control information involves, for example, using the combined eye position and gaze direction probability information from the eye and gaze probability model 1506 to determine the importance of rays within the light field using a light field importance calculator 1508 to generate a feature vector function $I(x,y,u,v)$. A light field processor 1510 can combine the feature vector function $I(x,y,u,v)$ with scene content 1512 provide view requests to view renderers 1514, which then renders and returns views to light field processor 1510. These views are then utilized by light field processor 1510 to generate control information as specific pixel values for the angular pixels of the light field display.

While specific processes are described above with reference to FIG. 15 for rendering foveated views based upon gaze tracking information, any of a variety of processes can be utilized to render views having varying resolution and representation of depth cues to increase the computational efficiency of the light field display as appropriate to the requirements of specific applications in accordance with various embodiments of the invention. In systems in which only head or eye tracking information is available (and not gaze tracking), the light field display can make decisions based upon the complexity of the views to render based upon the ability of the viewer to perceive image detail and depth queues. In a number of embodiments, the resolution and representation of depth cues varies based upon the distance of the viewer from the display. In other embodiments, any of a variety of factors can be considered in determining the level of detail and/or number of views that are rendered for display by a light field display.

While various processes for sampling scenes and rendering images for display based upon the tracked locations of the eyes of one or more viewer are described above with reference to FIGS. 10-15, any of a variety of processes can be utilized to modify the view displayed within a viewing zone of a light field display or conventional multiview autostereoscopic display based upon the location of a tracked eye within the viewing zone as appropriate to the requirements of a given application in accordance with various embodiments of the invention. For example, light field displays in accordance with several embodiments of the invention utilize a combination of anti-aliasing pre-filtering and eye-location-dependent rendering. In several embodiments, the light field display does not immediately fall back to conventional multiview autostereoscopic or 2D display in response to a loss of eye tracking but can estimate eye location based upon previously tracked eye locations. In certain embodiments, eye location predictions are also utilized to render views that will be displayed at a future time using predicted eye locations. Furthermore, the benefits of tracking eyes are not limited to increasing the perceived depth of field of a light field display. Eye tracking information can also be utilized to reduce the energy, processing, and/or bandwidth requirements of light field displays as is discussed further below.

Reducing Energy, Processing and/or Bandwidth Using Eye Tracking Information

Light field displays in accordance with many embodiments of the invention can use eye tracking information to reduce energy consumption and/or reduce the amount of bandwidth required between the processing system and the light field display's backplane to drive the display. In addition to eye tracking information providing information regarding viewing zones of the light field display that contain tracked eyes, the eye tracking information can identify viewing zones that do not contain tracked eyes. As noted above, many eye tracking systems provide both eye tracking information and confidence metrics that indicate the likelihood that an eye is located in a particular location. Accordingly, the light field display can determine that an eye is absent within a viewing zone and make decisions accordingly. In many embodiments, the light field display can save energy by turning off emitters that would otherwise be used to display views within the unoccupied viewing zones. Another benefit of deactivating emitters is an improvement in image quality due to a reduction in crosstalk. Significant processing efficiencies can also be achieved by only rendering views for viewing zones containing tracked eyes. In addition, the bandwidth required between the light field display's processing system and the backplane of the light field display can be reduced by only transmitting control information for active emitters (e.g., emitters that are utilized to display a view within a viewing zone occupied by a viewer's eye). Given fixed total bandwidth between a processing system and the backplane of a light field display, the bandwidth may be allocated based upon a set of viewpoints that have been identified with confidence in a manner that controls the angular and spatial resolution of views rendered within viewing zones across the field of view of the light field display to provide high perceived quality to the tracked viewers.

Energy-Efficient Control of Emitter Activation Using Eye Tracking Information

Figure 16:
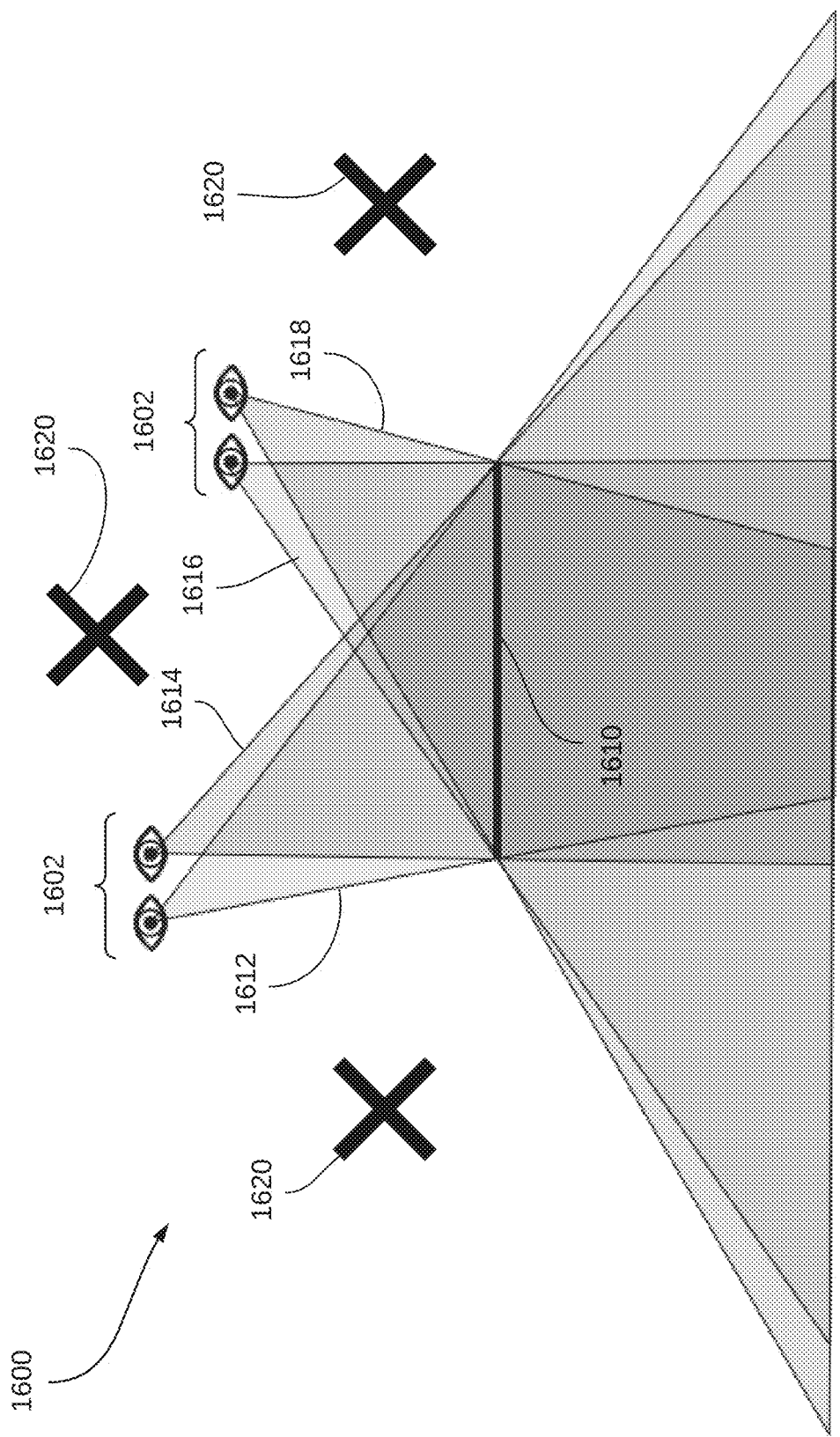
FIG. 16 conceptually illustrates a process for controlling the activation of emitters within a light field display in accordance with an embodiment of the invention.

A process for controlling the activation of emitters within a light field display in accordance with an embodiment of the invention is conceptually illustrated in FIG. 16. In the illustrated embodiment 1600, two sets of viewers 1602 and 1604 are shown and a display plane 1610 of a light field display generates multiview autostereoscopic views 1612, 1614, 1616, and 1618 within the viewing zones occupied by each of the viewers' eyes. The light field display exploits information concerning viewing zones that are not occupied by viewer eyes (indicated by X markings 1620) to switch off the emitters responsible for displaying views within those viewing zones.

Figure 17:
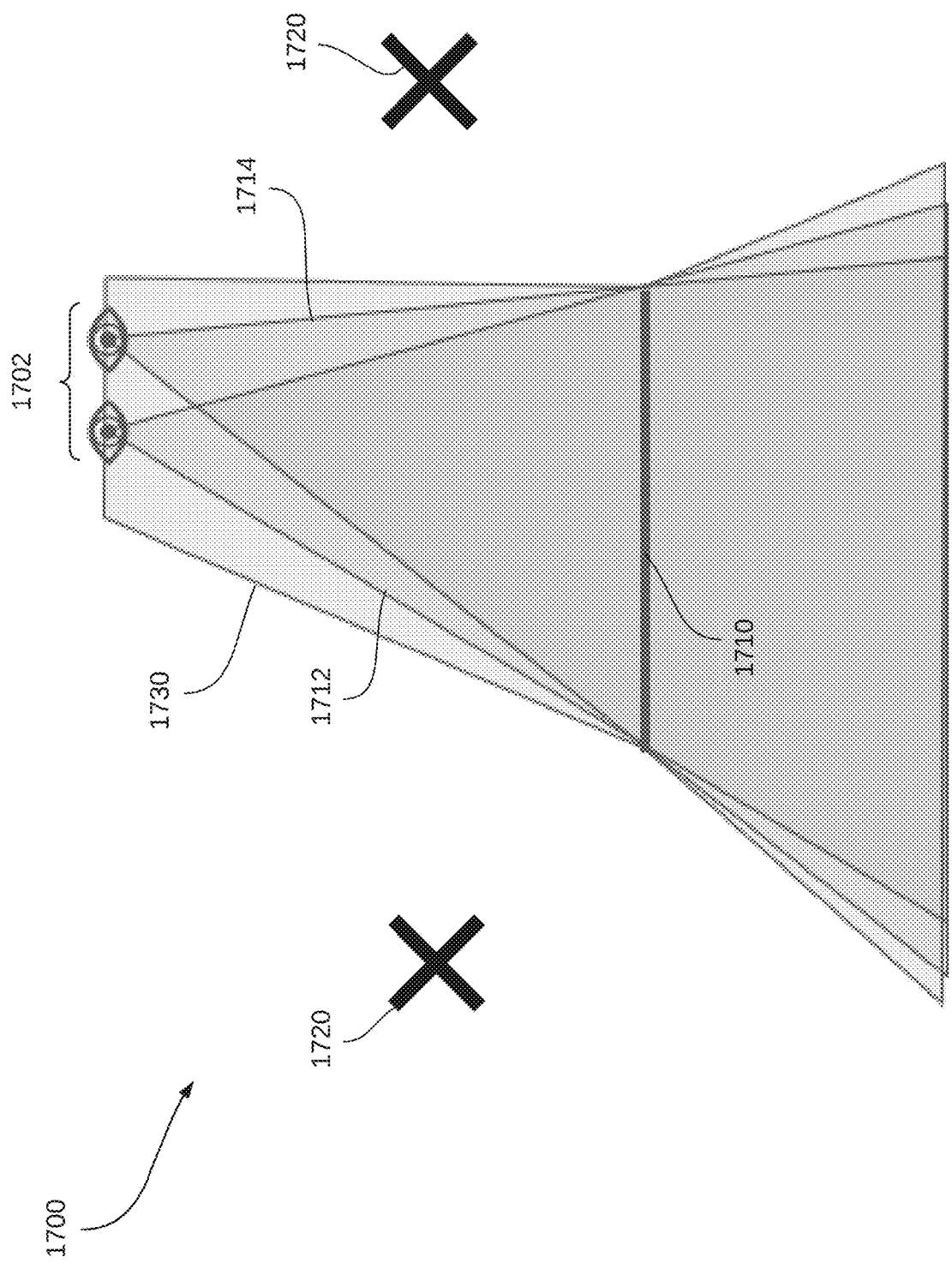
FIG. 17 conceptually illustrates a process that enables display of views in viewing zones adjacent to the viewing zones occupied by tracked eyes, in accordance with an embodiment of the invention.

In a number of embodiments, the light field display also displays views in viewing zones adjacent viewing zones occupied by tracked eyes as conceptually illustrated in FIG. 17. As shown in FIG. 17, embodiment 1700 includes a viewer 1702 viewing multiview autostereoscopic views 1712 and 1714 generated by a display plane 1710 of a light field display while the emitters contributing to views outside of the viewing zones (indicated by X markings 1720) are switched off or the views therein are reduced in resolution and/or brightness. In this case, display plane 1710 also generates views in a zone 1730 around the likely eye positions of viewer 1702. Some uncertainty may exist with respect to the location of tracked eyes, and light field displays in accordance with many embodiments of the invention will also render views for the viewing zones that are adjacent to the viewing zones occupied by tracked eyes, as in the example illustrated in FIG. 17. That is, even if there are uncertainties in the specific location of the viewer's eyes, a system such as shown in FIG. 17 can accommodate the uncertainty while still providing savings in energy and computation.

In addition, light field displays in accordance with several embodiments of the invention respond to a loss of eye tracking by rendering views in viewing zones that are likely to be occupied by previously tracked eyes based upon the tracked trajectory of the eyes prior to the loss of tracking. In many embodiments, the light field display displays lower resolution autostereoscopic views and/or 2D content (e.g., a single view that does not vary between viewing zones) in many or all of the viewing zones that are not occupied by tracked eyes as conceptually illustrated in FIG. 18. For example, in embodiment 1800 in FIG. 18, a viewer 1802 is viewing multiview autostereoscopic views 1812 and 1814 generated by a display plane 1810 of a light field display. Outside of views 1812 and 1814, a uniform 2D content or a lower resolution light field images are provided by display plane 1810 in a region 1840 outside of the viewer's eyes. In addition, the views in region 1840 can be refreshed at a lower frame rate to reduce the computational requirements of rendering views in viewing zones in which they are unlikely to be observed by a viewer. It is recognized herein that the specific manner in which a light field display responds to eye tracking uncertainty and/or an absence of a tracked eye within a particular viewing zone is largely dependent upon the requirements of a given application.

In certain embodiments, the light field display is configured to track a specific viewer's eyes and preserves the privacy of the display by only generating multiview autostereoscopic views within the viewing zones occupied by the viewer's eyes and potentially in adjacent viewing zones. In several embodiments, the presence of the eyes of an unauthorized viewer can be detected and the light field display can actively prevent the display of views in viewing zones occupied by the eyes of an unauthorized viewer. In many embodiments, the location and image of a viewer's head is utilized to determine whether a viewer is an authorized or an unauthorized viewer. In a number of embodiments, facial recognition and/or a fiducial can be utilized to differentiate between authorized and unauthorized viewers.

Reducing Pixel-Level Optical Crosstalk Using Eye Tracking Information

Reducing the number of active emitters in a light field display based upon eye tracking information can further improve image quality by reducing both intra-microlens and inter-microlens crosstalk. For instance, internal reflections and scattering within the optical system of an angular pixel can cause crosstalk both within the angular pixel (which can be referred to as intra-microlens crosstalk) and between angular pixels (which can be referred to as inter-microlens crosstalk).

Figure 19A:
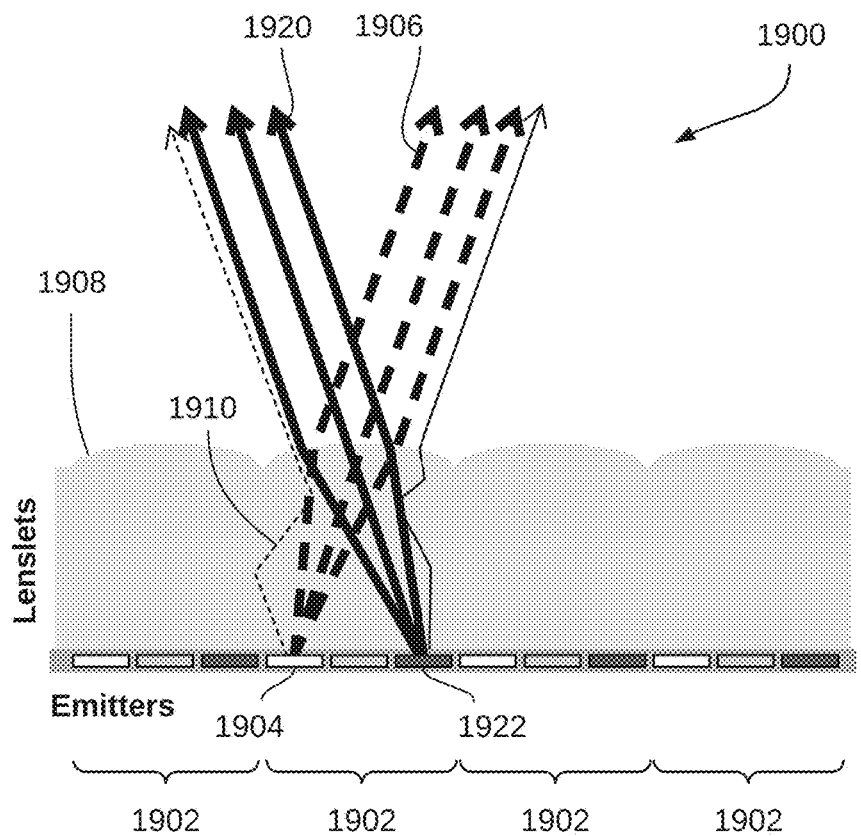
FIG. 19A conceptually illustrates a manner in which intra-microlens crosstalk can manifest.

An example of a manner in which intra-microlens crosstalk, i.e., crosstalk between light emission from light emitters within a single angular pixel, can manifest is conceptually illustrated in FIG. 19A. An example system 1900 includes a plurality of angular pixels 1902, as shown in FIG. 19A. A first emitter 1904 within one of angular pixels 1902 emits a cone of light, represented by dashed arrows 1906. While the majority of the rays within the cone of light are directed toward specific viewing zones by optical system 1908 (e.g., microlens array) of the angular pixel, stray rays 1910 can be reflected or refracted within and at interfaces between adjacent angular pixels and coupled into a light cone (represented by solid arrows 1920) emitted by a second emitter 1922 within system 1900. In this way, a viewer with an eye in a viewing zone that intersects the light cone 1920 of the second emitter 1922 will perceive a mixture of the light from the first emitter 1904 and the second emitter 1922. It is recognized herein that the ability to switch off the first emitter 1904 when there are no tracked eyes in viewing zones that receive light from the first emitter enables the light field display including angular pixels such as shown in FIG. 12 to reduce intra-microlens crosstalk within viewing zones that receive light from the second emitter 1922.

Figure 19B:
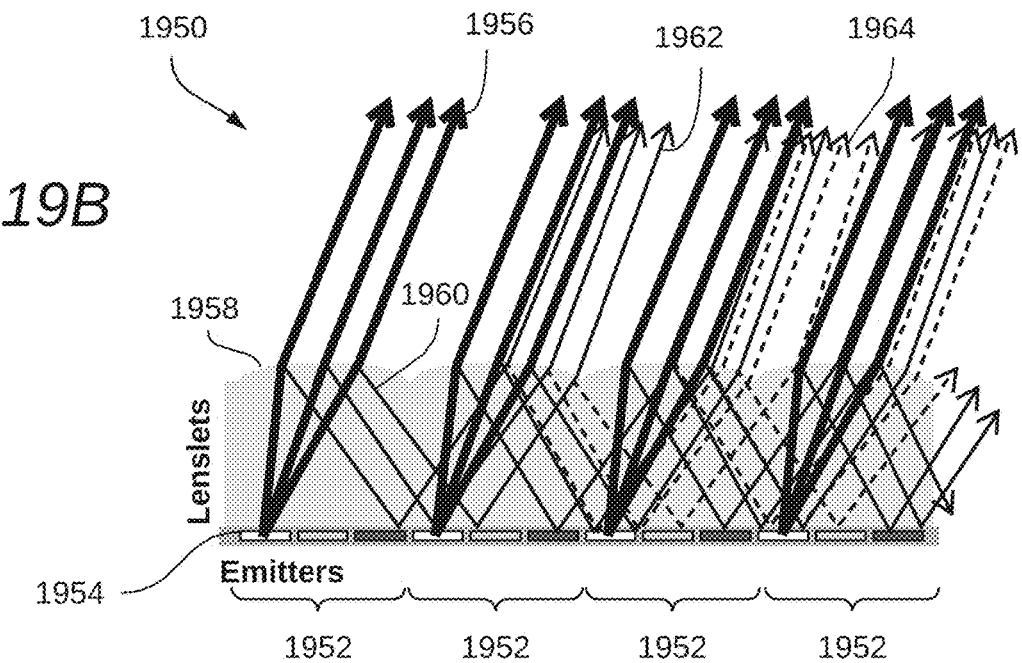
FIG. 19B conceptually illustrates a manner in which inter-microlens crosstalk can manifest.

The manner in which inter-microlens crosstalk, i.e., crosstalk between light emission from different angular pixels, can manifest is conceptually illustrated in FIG. 19B. An example system 1950 includes a plurality of angular pixels 1952, as shown in FIG. 19B. A first emitter 1954 in one of angular pixel 1952 produces a light cone, represented by solid lines 1956, that is directed toward specific viewing zones by optical system 1958 (e.g., microlens array) of the angular pixel. A portion of the light cone 1956 is reflected at an air-microlens interface as reflected light (represented by lines 1960). The reflected rays can also be reflected within the light field display and emerge from a neighboring angular pixel, as represented by thin arrows 1962. Further internal reflections may result in additional stray light from neighboring angular pixels, such as represented by dashed arrows 1964. That is, the ability to switch off the first emitter 1954 when there are no tracked eyes in viewing zones that receive light from the first emitter enables the light field display to reduce inter-microlens crosstalk in adjacent angular pixels.

The extent to which both intra-microlens and inter-microlens crosstalk are generated by a light field display is largely dependent upon the amount of light that is reflected or scattered within the angular pixels within the light field display. Accordingly, only turning on emitters that contribute to views within viewing zones occupied by tracked eyes can significantly reduce the amount of intra-microlens and inter-microlens crosstalk. With specific regard to intra-microlens crosstalk, reducing the number of active emitters within each angular pixel can significantly decrease the amount of light that is internally reflected within the optical systems of the angular pixels. Accordingly, the ratio of reflected or scattered light to directly emitted light perceived at a viewer's eyes is reduced compared to a system in which all emitters are active at all times. Similarly, reducing the number of active emitters within an angular pixel reduces the amount of light that is reflected or scattered into adjacent angular pixels. Therefore, the ratio of reflected or scattered light to directly emitted light perceived at a viewer's eyes is similarly reduced compared to a system in which all emitters are active. Furthermore, as discussed above, turning off emitters that are not contributing to views presented at the tracked eye locations can also lead to energy and computational bandwidth savings, thus improving the efficiency of the light field display.

Controlling Emitter Activation Using Eye Tracking Information

Specifically addressing the computational bandwidth required in generating light field views, the computational load on the processing system as well as the internal bandwidth requirements of a light field display increases with the number of views that are rendered and the frame rate of the display. Furthermore, the energy requirements of the light field display increase with the number of viewing zones. Accordingly, the processing, bandwidth and/or energy requirements of light field displays in accordance with many embodiments of the invention can be significantly impacted by decisions concerning whether to render views for display only in specific viewing zones corresponding to tracked eyes, the number of viewing zones for which views are rendered, whether to render and display 2D or 3D views in additional viewing zones, the number of viewing zones in which to display the 2D view, and/or the number of viewing zones that are deemed inactive. The specific manner in which a light field display in accordance with various embodiments of the invention is configured to render views for display in active viewing zones based upon eye tracking information is largely dependent upon the capabilities of the display and the requirements of a given application.

Figure 20:
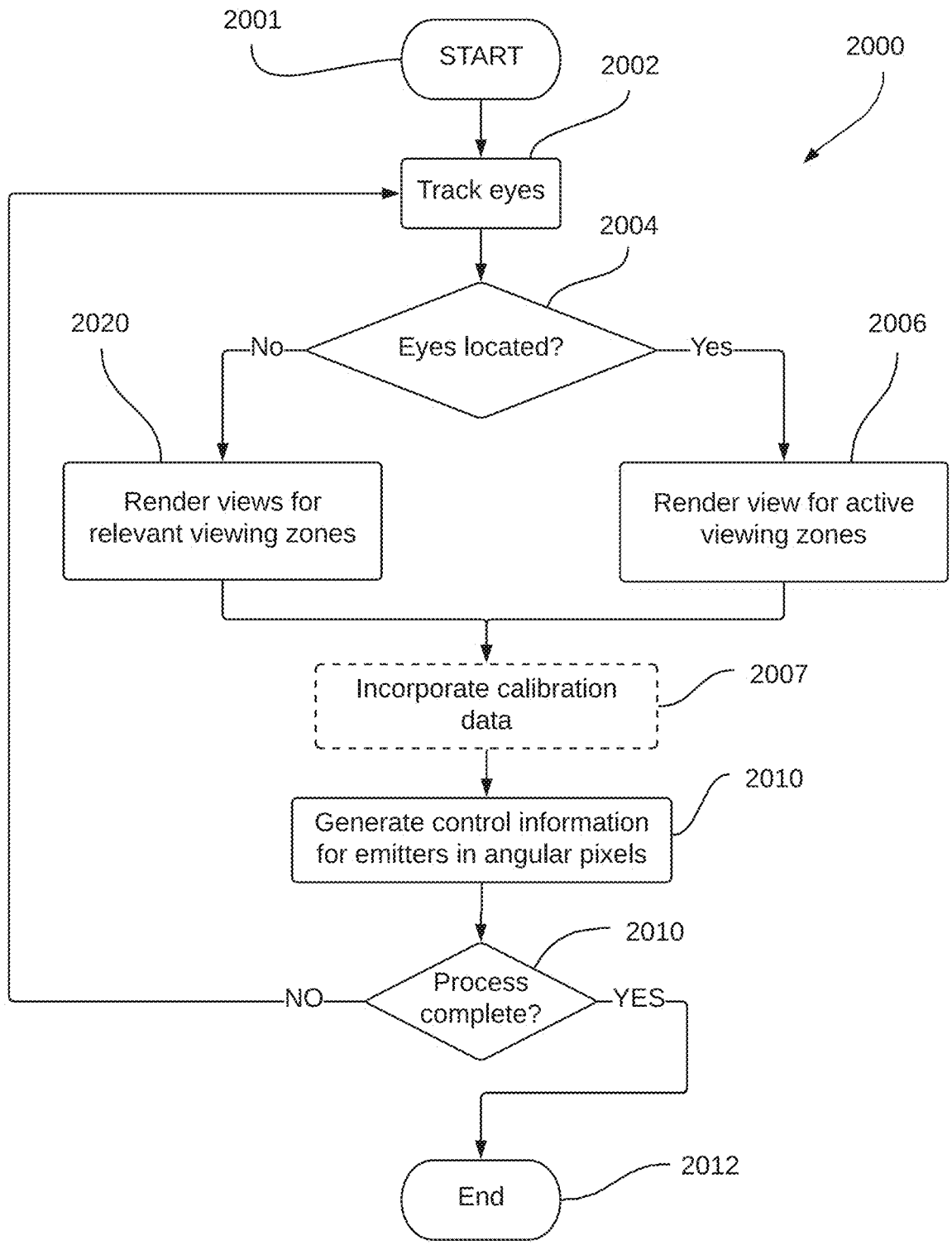
FIG. 20 illustrates a process for controlling activation of emitters of a light field display, based upon eye tracking information, in order to display views in viewing zones occupied by tracked eyes, in accordance with an embodiment of the invention.

A process for controlling activation of emitters based upon eye tracking information in order to display views in viewing zones occupied by tracked eyes in accordance with an embodiment of the invention is illustrated in FIG. 20. A process 2000 begins with a start step 2001, followed by a step 2002 to track the eyes of a viewer using, for example, an eye tracker arrangement integrated with the light field display, such as shown in FIG. 2. Then, a determination 2004 is made that the eyes of a viewer are located. The eye tracking information can be utilized to identify the viewing zones occupied by tracked eyes and the light field display processing system can render 2006 views for display in the identified, active viewing zones. For instance, the views can be viewpoint dependent and rendered specifically for the viewing zone to preserve stereo and motion parallax for the viewer. Optionally, if calibration data, such as factory settings for the emitters of the array or angular pixels in the display area or other calibration information as described above, are stored in a memory of the display, such as on a processing unit, the calibration in formation can be incorporated in a step 2007 into the rendered views from step 2006. In a step 2008, the rendered views are then used to generate control information for the emitters in the angular pixels to actually generate the views by the display. A determination 2010 is made to determine whether the eye tracking and view rendering process is complete. If the answer to determination 2010 is YES, the process is completed, then process 2000 proceeds to an end step 2012. If determination 2010 concludes that the eye tracking and view rendering process is not yet complete, the process returns to step 2002 to attempt to track the eyes of the viewer.

When the light field display loses eye tracking such that determination 2004 resulting in the answer that the eyes have not been located, the processing system of the light field display can render 2020 views for viewing zones that are likely to be occupied by a viewer's eyes based upon prior tracking information or other a priori information. For instance, the processing system can render or utilize a separately rendered 2D view or a lower resolution view and display the view in viewing zones likely to be occupied by a viewer's eyes based upon prior tracking information. The relevant control information is then generated in step 2008, and the process again proceeds to determination 2010 to determine whether the process is completed.

Figure 18:
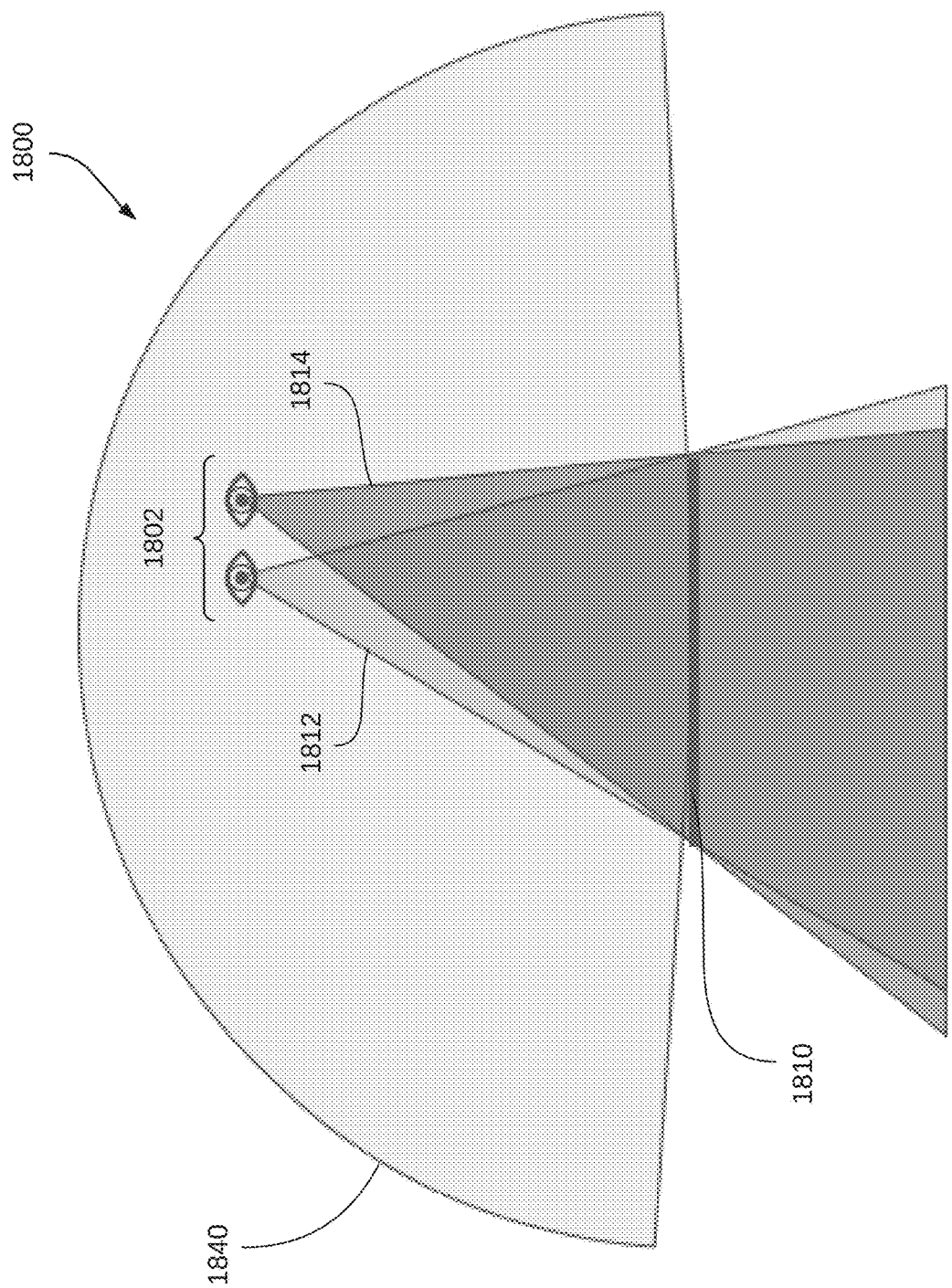
FIG. 18 conceptually illustrates a light field display, in accordance with an embodiment of the invention, displaying simplified content in viewing zones that are not occupied by tracked eyes.

In a number of embodiments, views can also be rendered for viewing zones adjacent to the viewing zones occupied by tracked eyes, such as illustrated in FIG. 17. In several embodiments, these views outside of the viewing zones occupied by tracked eyes can be rendered at lower resolution and/or with less detailed depth cues to reduce the computational overhead associated with rendering additional views in viewing zones that may not be occupied by viewers' eyes. In certain embodiments, a 2D view can also be rendered for display in some or all of the viewing zones that are not occupied by tracked eyes, as illustrated in FIG. 18. In many embodiments, the light field display does not display views in a number of the viewing zones that are unoccupied by tracked eyes, as illustrated in FIG. 16. Additionally, the light field display may have different modes and/or employ decision logic to determine whether to activate emitters to display a 2D view or to switch off emitters when a viewing zone is unoccupied by a tracked eye, as described above, as appropriate to the requirements of a given application.

The rendered views can then be utilized to generate 2008 control information to activate emitters within the light field display to contribute to the appropriate light field views. In many embodiments, the active emitters are the emitters utilized to display views. As noted above, a viewing zone can display a view specifically rendered for the viewing zone (e.g., when a particular viewing zone contains a tracked eye) or a view that is displayed in multiple viewing zones (such as a 2D view or a lower resolution view). As the bandwidth required for the processing system to provide the control information to the backplane (i.e., control circuitry) of the light field display is typically dependent upon the number of views displayed by the light field display, the bandwidth is reduced when control information is provided only for active emitters contributing to views in the active viewing zones. In several embodiments, the processing system provides a view that is common to multiple viewing zones (2D view) with metadata indicating the viewing zones in which the 2D view is displayed. In many embodiments, the amount of information that is transmitted to the backplane can be reduced by enabling the light field display controller to control a smaller number of logical emitters than there are physical emitters in a given angular pixel. In this way, the bandwidth requirements between the controller and the backplane of the emitter array of the light field display can be reduced. Furthermore, circuitry within the backplane can be made responsible for interpolating control information for logical emitters to control information for a larger number of emitters within an angular pixel.

By way of example, there can be 500×500 physical light emitters that in combination with a lenslet form an angular pixel. The controller, however, may only be able to control emitters corresponding to 100 directions. For example, a unique color could be specified for each logical emitter in a 10×10 grid of logical emitters corresponding to the 500×500 physical emitters, and the corresponding control information is then utilized by the backplane to interpolate values within a 50×50 subgrid of physical emitters corresponding to each logical emitter. In another control mode, the controller can address a specific set of logical emitters corresponding to the 100 logical emitters corresponding to the physical emitters contributing to views perceived by the tracked eyes of a viewer. The backplane control circuitry can then take the control information corresponding to these 100 logical emitters and control the activation and/or interpolate the color of the remaining physical emitters in the angular pixel. The specific logical emitters that are addressed by the controller can be addressed in a number of ways including (but not limited to) providing an index and/or providing a subwindow within the larger array of logical emitters controlling the physical emitters forming the angular pixel. Furthermore, control information between the controller and the backplane can be run length encoded to further reduce the bandwidth requirements of the control information passing between the controller and the backplane.

The numbers of logical and physical emitters referenced above are provided merely by way of example, and light field displays can use angular pixels that include arrays of any number of emitters. In addition, the specific control information describing the active emitters and associated metadata provided by the processing system to the backplane of the light field display is largely dependent upon the requirements of a specific application. Further, the specific manner in which the light field display can respond to losing tracking of one or both of a viewer's eyes typically depends upon the requirements of a given application. Also, the availability of gaze tracking information in addition to eye tracking information can enable additional efficiency gains as is discussed further below.

While a number of processes for rendering views for display via a light field display and for providing control information for active pixels to the control circuitry of a light field display based upon eye tracking and/or gaze tracking information are described above with reference to the figures, any of a variety of techniques can be utilized for rendering views and determining viewing zones in which to render views based upon head, eye, and/or gaze tracking information as appropriate to the requirements of a given application in accordance with various embodiments of the invention.

Accelerated View Synthesis Using Post-Rendering Image Warps

In many instances, the time taken to directly render a view of a scene from a 3D model of the scene for display in each viewing zone occupied by a tracked eye may be too slow to accommodate a desired display frame rate. In addition, eyes can move much faster than the display refresh rate. Therefore, eye position can change from the point in time at which a light field display commences rendering a view for the eye and the point in time at which the rendering is complete and the view is displayed to the eye. Accordingly, light field displays in accordance with many embodiments of the invention employ an image rendering pipeline that utilizes a cascade of successively simpler and faster renderers running on a parallel processing unit such as (but not limited to) a GPU to render views based upon eye tracking information at a desired frame rate in a manner that increases the likelihood that the displayed view is appropriate to the viewpoint of a viewer's eyes at the point in time at which the display is refreshed. In a number of embodiments, an initial renderer is implemented on the parallel processing unit that continuously produces sets of 2D views with accompanying depth maps. These 2D views with accompanying depth maps can then be utilized to perform much faster post-processing 3D and/or 2D warps and translations so that the final view that is displayed in the viewing zone occupied by a viewer's eye is rendered from a viewpoint that corresponds as closely as possible to the location of the viewer's eye within the viewing zone at the time the view is displayed. In other words, at each point within the view rendering pipeline, the latest eye tracking information is fed into the processing performed at that point, thus providing faster and more accurate view rendering for the tracked eye location.

Figure 21:
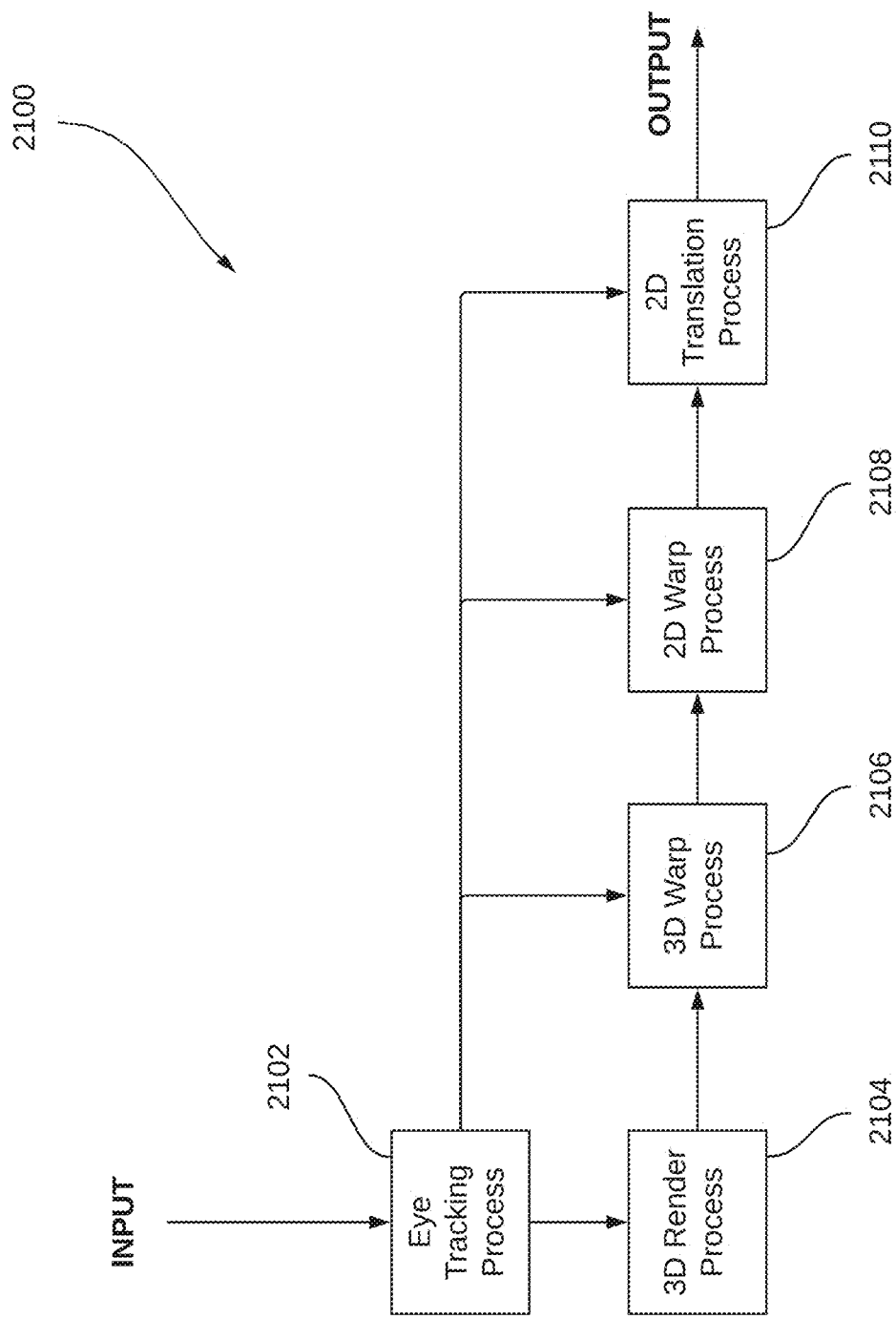
FIG. 21 conceptually illustrates a view rendering pipeline for a light field display incorporating eye tracking, in accordance with an embodiment of the invention.

A view rendering pipeline 2100 in accordance with an embodiment of the invention is conceptually illustrated in FIG. 21. The view rendering pipeline 2100 receives eye tracking information concerning the location of the tracked eyes of a viewer from an eye tracker process 2102. The eye tracking information can refresh at an extremely high rate (e.g., 30 kHz) using currently available equipment. An initial 3D rendering process 2104 can be performed on a parallel processing unit in which sets of 2D images with accompanying depth maps are generated. In many embodiments, the renderer generates a set of images at a rate that is similar to the frame rate of the display (e.g., 24 Hz, 30 Hz, 60 Hz, etc.). In several embodiments, the set of images and accompanying depth maps includes a number of images and accompanying depth maps that is greater than the number of detected viewers. The rendering process can generate an image and depth map from the viewpoint of a detected eye (or a nearby viewpoint) and additional viewpoints. As discussed below, the additional viewpoints enable interpolation and warping to produce a final view that is displayed within a viewing zone occupied by the tracked eye. In several embodiments, the rendered 2D images correspond to views that are larger, and have higher resolution, than the views that can be displayed by the light field display in order to accommodate subsequent warp and translation processes.

Continuing to refer to FIG. 21, prior to display, a series of post-rendering warps and translations are performed using the set of 2D images and accompanying depth maps from 3D render process 2104 based upon updated eye tracking information to generate the final views that are displayed. In the illustrated embodiment, a post-rendering 3D warp process 2106 is performed that fuses adjacent 2D images based upon their accompanying depth information to form updated 2D images and accompanying depth maps from viewpoints corresponding to the updated locations of the tracked eyes. In many embodiments, the post-rendering warps and translations can be performed using a process that is an order of magnitude faster than the initial rendering process.

As additional eye tracking updates are received by the processing system, the view rendering pipeline 2100 can continue to adjust the rendered views prior to display using even faster processes. In this illustrated embodiment, a 2D warp process 2108 is utilized to apply 2D warps and translations to adjust the updated 2D images in response to further updated eye tracking information. In several embodiments, the 2D warp process 2108 is an order of magnitude faster again than the 3D warp process 2106. These 2D warped images can then be finally adjusted using an extremely fast 2D translation process 2110 based upon final eye tracking locations immediately prior to being sent as an output to be displayed from the light field display. In certain embodiments, the 2D translation process 2110 can be an order of magnitude faster again than the 2D warp process 2108 and capable of performing the 2D warp process at a rate comparable to the sampling rate of the eye tracking process. In this way, the views that are displayed in specific viewing zones are rendered from viewpoints that correspond as closely as possible to the most recently tracked locations of each viewer's eyes. As noted above, the ability to render views that are specific to the location of the viewer's eyes as opposed to simply the specific viewing zone occupied by the viewer's eyes can significantly decrease the extent of the depth-dependent aliasing and other artifacts perceived by the viewer.

While specific processes are described above for rendering views using parallel processing units in a manner that is dependent upon updated eye tracking information with reference to FIG. 21, any of a variety of rendering processes and/or pipelines can be utilized as appropriate to the requirements of specific applications and/or the manner in which the video content is encoded. In a number of embodiments, the video content is generated using 3D models of a scene. In several embodiments, the video content is encoded using a multiview video codec that provides multiple encoded 2D images and one or more uncompressed or compressed depth maps and/or occlusion maps. Accordingly, the manner in which an image processing pipeline renders an initial set of 2D images and accompanying depth maps that can be utilized in subsequent 3D and/or 2D warp and translation processes is largely dependent upon the requirements of a specific application.

While the above description contains many specific embodiments of the invention, these should not be construed as limitations on the scope of the invention, but rather as examples of particular embodiments thereof. For example, the above discussion frequently references light field displays that incorporate eye trackers. As can readily be appreciated, many of the systems and processes described above can be implemented in conventional multiview autostereoscopic displays and/or within displays that capture head tracking and/or gaze tracking information. Additionally, if facial recognition or other ways to distinguish between different viewers are integrated into the eye tracking system, then explicit user recognition and rendering of user-specific, personalized content (i.e., not viewable by other users) can be implemented. Another extension of the above described concepts, as a subset of a full autostereoscopic viewing experience, would be to show tracked stereo views (i.e., only two views) on the multiview display for single or multiple users.

To reiterate, some of the aspects of the embodiments described above include, for example:

- The combination of a multiview autostereoscopic display integrated with an eye tracking system including one or more eye trackers, providing view rendering based on the tracked position of at least one viewer's eyes.
- The multiview autostereoscopic display integrated with an eye tracking system, where the display includes an array of angular pixels, each angular pixel including a plurality of emitters. In some embodiments, the angular pixel includes one or more microlenses and other optical elements.
- The multiview autostereoscopic display integrated with an eye tracking system, where the eye tracking system tracks the eyes of at least one viewer using a hierarchical tracking process.
- The multiview autostereoscopic display integrated with an eye tracking system, where the image resolution, density of views, and the type of views (two- or three-dimensional) of the rendered view depends on the tracked eye positions.
- The multiview autostereoscopic display integrated with an eye tracking system, where views outside those viewing zones in which eyes have been located are turned off.
- The multiview autostereoscopic display integrated with an eye tracking system, where views with higher resolution or density of views are presented at at least one foveated region in which an eye or gaze has been tracked.
- The multiview autostereoscopic display integrated with an eye tracking system, where the eyes of multiple viewers of the display are tracked. In some embodiments, one eye tracker tracks the eyes of multiple viewers. In other embodiments, multiple eye trackers are used to track the eyes of multiple viewers.
- The multiview autostereoscopic display integrated with an eye tracking system, where different views are presented in different viewing zones, according to the eye tracking information. Higher resolution or higher density of views can be presented in the viewing zones in which eyes of viewer(s) have been located. Lower resolution or lower density or views, two-dimensional only views, or even no view can be presented in viewing zones in which eyes of viewer(s) have not been located. The decision to modify the views presented in specific viewing zones can also take into account the confidence with which the eye tracking information is considered accurate. In this way, savings in the display energy consumption and/or image processing and data transfer bandwidth can be achieved.

The multiview autostereoscopic display integrated with an eye tracking system, where the processing system is further configured for optimizing the control information sent to control the angular pixels for mitigating at least one of a variety of factors affecting the image quality, such as optical crosstalk between viewing zones (e.g., ghosting, aliasing) and pixel-level optical crosstalk that may result from non-ideal optical elements and/or emitter performance.

The multiview autostereoscopic display integrated with an eye tracking system, where a view rendering pipeline within the processing system takes into account updated eye tracking information during the view rendering process so as to reduce the computational bandwidth required in the view rendering process while improving the image quality as seen by the viewer.

Accordingly, the scope of the invention should be determined not by the embodiments illustrated, but by the appended claims and their equivalents.

What is claimed is:

1. A multiview autostereoscopic display for providing a plurality of views to a viewer, comprising:
    a display area comprising an array of angular pixels, where:
    each angular pixel is configured for emitting light that varies across a field of view of that angular pixel; and
    the array of angular pixels is configured for displaying different views in different viewing zones across a field of view of the display;
    at least one eye tracker configured for (i) detecting the presence of eyes of the viewer within specific viewing zones, (ii) producing eye tracking information related to locations of the eyes so detected within the specific viewing zones, and (iii) detecting locations of the detected eyes within the specific viewing zones by performing a hierarchical eye tracking process comprising determining a location of the viewer, determining a location of a head of the viewer based on the location of the viewer so determined, and determining locations of the viewer's eyes based upon the location of the head of the viewer so determined; and
    a processing system, where the processing system is configured for:
        rendering a specific view for each one of the eyes so detected based upon the location of that eye within the viewing zone in which that eye was detected; and
        generating control information for the array of angular pixels to cause the specific view for that eye to be displayed in the viewing zone in which that eye was detected.

2. The multiview autostereoscopic display of claim 1, wherein the processing system is configured for rendering an updated view for each one of the eyes so detected based upon an updated location for that eye within the viewing zone in which that eye was previously detected.

3. The multiview autostereoscopic display of claim 2, wherein the processing system is configured for rendering the updated view based upon a relative motion between a previous location for the detected eye and the updated location for the detected eye.

4. The multiview autostereoscopic display of claim 1, wherein the processing system is configured for rendering at least one of reduced resolution views, reduced density views, and two-dimensional views for display in specific viewing zones based upon eye tracking information.

5. The multiview autostereoscopic display of claim 4,
    wherein the eye tracking information includes confidence information indicating a level of uncertainty associated with a tracked eye location, and
    wherein the processing system is further configured for adjusting the rendering according to the confidence information.

6. The multiview autostereoscopic display of claim 1, wherein the processing system is configured for generating control information to control activation of emitters within the array of angular pixels based upon eye tracking information to prevent display of views in specific viewing zones.

7. The multiview autostereoscopic display of claim 1, wherein the processing system is configured for rendering specific views for each one of the eyes so detected based upon the location of that eye within the viewing zone in which that eye was detected and in manner constrained by a determined viewer specific inter-pupil distance.

8. The multiview autostereoscopic display of claim 1, wherein:
    the at least one eye tracker comprises at least one gaze tracker configured for determining a gaze direction for each detected eye of the viewer; and
    the processing system is configured for rendering a specific view for each detected eye based upon the location of the detected eye within the viewing zone in which the eye was detected and the gaze direction of the detected eye.

9. A multiview autostereoscopic display
    for providing views viewable by a first viewer and a second viewer, comprising:
    a display area comprising an array of angular pixels, where:
    each angular pixel is configured for emitting light that varies across a field of view of that angular pixel; and
    the array of angular pixels is configured for displaying different views in different viewing zones across a field of view of the display;
    at least one eye tracker configured for (i) detecting the presence of eyes of the first viewer and eyes of the second viewer within specific viewing zones, (ii) producing eye tracking information related to locations of the eyes so detected within the specific viewing zones; and (iii) simultaneously tracking eyes of the first and second viewers; and
    a processing system configured for:
        rendering a specific view for each one of the eyes so detected based upon the location of that eye within the viewing zone in which that eye was detected;
        generating control information for the array of angular pixels to cause the specific view for that eye to be displayed in the viewing zone in which that eye was detected;
        rendering specific views based upon a first scene for each detected eye of the first viewer, rendering additional views based upon a second scene for each detected eye of the second viewer, the second scene being at least partially different from the first scene, and generating control information for the array of angular pixels such that, simultaneously, the specific views for each detected eye of the first viewer are displayed in viewing zones in which the eyes of the first viewer were detected, and the additional views for each detected eye of the second viewer are displayed in viewing zones in which the second viewer's eyes were detected.

10. The multiview autostereoscopic display of claim 9, wherein the control information so generated by the processing system causes no view to be displayed outside the viewing zones in which at least one of the first and second viewers' eyes were detected.

11. A multiview autostereoscopic display
for providing views viewable by a first viewer and a second viewer, comprising:
a display area comprising an array of angular pixels, where:
each angular pixel is configured for emitting light that varies across a field of view of that angular pixel; and
the array of angular pixels is configured for displaying different views in different viewing zones across a field of view of the display;
an eye tracker that (i) includes a first eye tracker for tracking eyes of the first viewer and a second eye tracker for tracking eyes of the second viewer, and (ii) is configured for detecting the presence of eyes of the viewer within specific viewing zones, and producing eye tracking information related to locations of the eyes so detected within the specific viewing zones; and
a processing system configured for:
rendering a specific view for each one of the eyes so detected based upon the location of that eye within the viewing zone in which that eye was detected;
generating control information for the array of angular pixels to cause the specific view for that eye to be displayed in the viewing zone in which that eye was detected;
rendering specific views based upon a first scene for each detected eye of the first viewer,
rendering additional views based upon a second scene for each detected eye of the second viewer, the second scene being at least partially different from the first scene, and
generating control information for the array of angular pixels such that, simultaneously, the specific views for each detected eye of the first viewer are displayed in viewing zones in which the eyes of the first viewer were detected, and the additional views for each detected eye of the second viewer are displayed in the viewing zones in which the second viewer's eyes were detected.

12. The multiview autostereoscopic display of claim 11, wherein the control information so generated by the processing system causes no view to be displayed outside the viewing zones in which at least one of the first and second viewers' eyes were detected.

13. A multiview autostereoscopic display for providing a plurality of views to a viewer, comprising:
a display area including an array of angular pixels;
an eye tracker; and
a processing system,
wherein each angular pixel is configured for emitting light that varies across a field of view of that angular pixel,
wherein the array of angular pixels is configured for displaying different views in different viewing zones across a field of view of the display,
wherein the eye tracker is configured for detecting the presence of eyes of the viewer within specific viewing zones, and producing eye tracking information related to locations of the eyes so detected within the specific viewing zones,
wherein the processing system is configured for rendering a specific view for each one of the eyes so detected within the viewing zone in which that eye was detected,
wherein the processing system is further configured for generating control information for the array of angular pixels to cause the specific view for each one of the eyes so detected to be displayed in the viewing zone in which that eye was detected, and
wherein the control information includes activation information for the array of angular pixels to control activation of emitters within the array of angular pixels based upon the eye tracking information to turn off a portion of the emitters contributing to views outside of the viewing zone in which that eye was detected.

14. The multiview autostereoscopic display of claim 13, wherein the processing system is further configured for rendering at least one of reduced resolution views, reduced density views, and two-dimensional views for display in specific viewing zones based upon the eye tracking information.

15. The multiview autostereoscopic display of claim 13, wherein the processing system is further configured for optimizing the control information for mitigating at least one of aliasing, ghosting, optical crosstalk between viewing zones, and pixel-level optical crosstalk.

16. A multiview autostereoscopic display for providing a plurality of views to a viewer, comprising:
a display area comprising an array of angular pixels, where:
each angular pixel is configured for emitting light that varies across a field of view of that angular pixel; and
the array of angular pixels is configured for displaying different views in different viewing zones across a field of view of the display;
at least one eye tracker configured for detecting the presence of eyes of the viewer within specific viewing zones and producing eye tracking information related to locations of the eyes so detected within the specific viewing zones; and
a processing system, where the processing system is configured for:
rendering a specific view for each one of the eyes so detected based upon the location of that eye within the viewing zone in which that eye was detected;
generating control information for the array of angular pixels to cause the specific view for that eye to be displayed in the viewing zone in which that eye was detected;

generating control information for a plurality of logical emitters;

the display area further including backplane circuitry configured for (i) receiving the control information for the plurality of logical emitters, and (ii) interpolating the control information for the plurality of logical emitters to control information for the array of angular pixels in the display area.

* * * * *